(12) United States Patent
Naujok et al.

(10) Patent No.: US 12,457,486 B2
(45) Date of Patent: Oct. 28, 2025

(54) TRANSMITTING A COMPLEMENT OF USER PARAMETERS TO A COMMUNICATIONS DEVICE

(71) Applicant: Prove Identity, Inc., New York, NY (US)

(72) Inventors: Jeffrey Robert Naujok, Colorado Springs, CO (US); Prashant Janakrai Desai, New York, NY (US); Michael Stearne, Bellmawr, NJ (US); Rodger R. Desai, New York, NY (US); Ryan Alexander, Snohomish, WA (US); Kyle Price, New York, NY (US)

(73) Assignee: Prove Identity, Inc., New York, NY (US)

( * ) Notice: Subject to any disclaimer, the term of this patent is extended or adjusted under 35 U.S.C. 154(b) by 164 days.

(21) Appl. No.: 17/570,335

(22) Filed: Jan. 6, 2022

(65) Prior Publication Data

US 2022/0217527 A1 Jul. 7, 2022

Related U.S. Application Data

(60) Provisional application No. 63/134,914, filed on Jan. 7, 2021.

(51) Int. Cl.
*H04W 4/00* (2018.01)
*H04W 8/20* (2009.01)
(Continued)

(52) U.S. Cl.
CPC ............. *H04W 8/20* (2013.01); *H04W 12/71* (2021.01); *H04W 12/72* (2021.01); *H04W 12/75* (2021.01)

(58) Field of Classification Search
CPC ........ H04W 12/71; H04W 12/72; H04W 8/20
See application file for complete search history.

(56) References Cited

U.S. PATENT DOCUMENTS

| 6,049,712 A | 4/2000 | Wallinder |
| 8,145,561 B1 | 3/2012 | Zhu |

(Continued)

FOREIGN PATENT DOCUMENTS

| EP | 1197928 | 4/2002 |
| KR | 20060077541 | 7/2006 |

(Continued)

OTHER PUBLICATIONS

Anonymous, Method and Apparatus for Mobile Identity Authentication, Publication Date Mar. 29, 2010, 71 pages, Doc 1083.

(Continued)

*Primary Examiner* — Shantell L Heiber
(74) *Attorney, Agent, or Firm* — Husch Blackwell LLP; Bryan D. Stewart; Matthew C. Francis

(57) ABSTRACT

Briefly, example methods, apparatuses, and/or articles of manufacture may be implemented, in whole or in part, using one or more computing devices to obtain, from a communications device, an identifier of the communications device transmitted via a communications network. The communications network may transmit a request for one or more parameters unique to a subscriber of the communications network. The method may also include processing signals indicative of the requested one or more parameters in response to the subscriber entering the one or more parameters into a graphical user interface of the communications device. The method may further include transmitting, to the communications device, one or more signals to provide a complement of subscriber parameters.

21 Claims, 5 Drawing Sheets

(51) Int. Cl.
  *H04W 12/71* (2021.01)
  *H04W 12/72* (2021.01)
  *H04W 12/75* (2021.01)

(56) References Cited

U.S. PATENT DOCUMENTS

| | | | |
|---|---|---|---|
| 8,489,635 | B1 | 7/2013 | Phoha |
| 8,606,640 | B2 | 12/2013 | Brody |
| 9,275,345 | B1 | 3/2016 | Song |
| 9,706,406 | B1 | 7/2017 | Adams |
| 9,747,596 | B2 | 8/2017 | Brody |
| 9,767,449 | B2 | 9/2017 | Brody |
| 9,906,954 | B2 | 2/2018 | McClement |
| 10,078,743 | B1 | 9/2018 | Baldi |
| 10,135,614 | B2 | 11/2018 | Roberts |
| 10,438,200 | B1 | 10/2019 | Griffith |
| 10,501,267 | B1 | 12/2019 | Chinoy |
| 10,531,295 | B2 | 1/2020 | McClement |
| 10,824,703 | B1 | 11/2020 | Desai |
| 10,867,025 | B2 | 12/2020 | Whaley |
| 11,159,940 | B2 | 10/2021 | Richard |
| 11,176,231 | B2 | 11/2021 | Whaley |
| 11,184,350 | B2 | 11/2021 | Mainali |
| 11,297,459 | B2 | 4/2022 | Raduchel |
| 11,748,380 | B1* | 9/2023 | Waful ................. G06F 40/174 707/608 |
| 2001/0037254 | A1 | 11/2001 | Glikman |
| 2002/0052754 | A1 | 5/2002 | Joyce |
| 2002/0143634 | A1 | 10/2002 | Kumar |
| 2003/0212601 | A1 | 11/2003 | Silva |
| 2004/0083394 | A1 | 4/2004 | Brebner |
| 2004/0243477 | A1 | 12/2004 | Mathai |
| 2005/0022034 | A1 | 1/2005 | Chaudhari |
| 2005/0075945 | A1 | 4/2005 | Hodge |
| 2005/0114020 | A1 | 5/2005 | Seto |
| 2006/0161646 | A1 | 7/2006 | Chene |
| 2006/0224470 | A1 | 10/2006 | Garcia Ruano |
| 2006/0294388 | A1 | 12/2006 | Abraham |
| 2007/0027803 | A1 | 2/2007 | Brandes |
| 2007/0043664 | A1 | 2/2007 | Wilkes |
| 2007/0055623 | A1 | 3/2007 | Ha |
| 2007/0121580 | A1 | 5/2007 | Forte et al. |
| 2007/0256122 | A1 | 11/2007 | Foo |
| 2007/0288377 | A1 | 12/2007 | Shaked |
| 2007/0299728 | A1 | 12/2007 | Nemirofsky |
| 2007/0299773 | A1 | 12/2007 | Soderstrom |
| 2008/0125117 | A1 | 5/2008 | Jiang |
| 2008/0139171 | A1 | 6/2008 | Bernath |
| 2008/0140548 | A1 | 6/2008 | Csoka |
| 2009/0006254 | A1 | 1/2009 | Mumm |
| 2009/0112872 | A1 | 4/2009 | Doi |
| 2010/0042835 | A1 | 2/2010 | Lee |
| 2010/0210242 | A1 | 8/2010 | Caudevilla |
| 2010/0235276 | A1 | 9/2010 | Smith |
| 2011/0022477 | A1 | 1/2011 | Hatridge |
| 2012/0164978 | A1 | 6/2012 | Conti |
| 2012/0197786 | A1 | 8/2012 | Brown |
| 2012/0321087 | A1 | 12/2012 | Fleischman |
| 2013/0117181 | A1 | 5/2013 | Isaacson |
| 2013/0132717 | A1 | 5/2013 | Brand et al. |
| 2014/0101044 | A1 | 4/2014 | Blackhurst |
| 2014/0289833 | A1 | 9/2014 | Briceno |
| 2014/0317734 | A1 | 10/2014 | Valencia |
| 2014/0372762 | A1 | 12/2014 | Flautner |
| 2015/0038120 | A1 | 2/2015 | Larkin |
| 2015/0093048 | A1 | 4/2015 | Smith |
| 2015/0135310 | A1 | 5/2015 | Lee |
| 2015/0170230 | A1 | 6/2015 | Panchal |
| 2015/0205957 | A1 | 7/2015 | Turgeman |
| 2015/0215305 | A1 | 7/2015 | Wetzel et al. |
| 2015/0242601 | A1 | 8/2015 | Griffiths |
| 2015/0332031 | A1 | 11/2015 | Mistry |
| 2016/0012465 | A1 | 1/2016 | Sharp |
| 2016/0050203 | A1 | 2/2016 | Hefetz |
| 2016/0057623 | A1 | 2/2016 | Dutt |
| 2016/0103996 | A1 | 4/2016 | Salajegheh |
| 2016/0110528 | A1 | 4/2016 | Gupta |
| 2016/0180068 | A1 | 6/2016 | Das |
| 2016/0182503 | A1 | 6/2016 | Cheng |
| 2016/0197918 | A1 | 7/2016 | Turgeman |
| 2016/0278664 | A1 | 9/2016 | Pant |
| 2016/0295512 | A1 | 10/2016 | Hara |
| 2016/0330199 | A1 | 11/2016 | Weiner |
| 2016/0342784 | A1 | 11/2016 | Beveridge |
| 2016/0350591 | A1 | 12/2016 | Kraft |
| 2017/0063852 | A1 | 3/2017 | Azar |
| 2017/0085564 | A1 | 3/2017 | Giobbi |
| 2017/0085565 | A1 | 3/2017 | Sheller |
| 2017/0195319 | A1* | 7/2017 | Gerber ................. G06Q 20/34 |
| 2017/0199588 | A1 | 7/2017 | Ahn |
| 2017/0289168 | A1 | 10/2017 | Bar |
| 2017/0337364 | A1 | 11/2017 | Whaley |
| 2018/0078179 | A1 | 3/2018 | Deng |
| 2018/0121921 | A1 | 5/2018 | Woo |
| 2018/0181741 | A1 | 6/2018 | Whaley |
| 2019/0245851 | A1 | 8/2019 | Whaley |
| 2019/0251534 | A1 | 8/2019 | Desai |
| 2019/0281442 | A1 | 9/2019 | Kim et al. |
| 2019/0295006 | A1 | 9/2019 | Zises |
| 2019/0325445 | A1 | 10/2019 | Anderson et al. |
| 2019/0349767 | A1 | 11/2019 | Rolfe |
| 2019/0370777 | A1 | 12/2019 | Brody |
| 2020/0092723 | A1 | 3/2020 | McClement |
| 2020/0104829 | A1 | 4/2020 | Arora et al. |
| 2020/0134151 | A1 | 4/2020 | Magi |
| 2020/0142856 | A1* | 5/2020 | Neelamana ......... G06F 18/2178 |
| 2020/0162515 | A1 | 5/2020 | Dubinsky |
| 2020/0242688 | A1* | 7/2020 | Navarro ............ G06Q 30/0214 |
| 2020/0252218 | A1 | 8/2020 | Wexler |
| 2020/0258084 | A1 | 8/2020 | Henderson |
| 2020/0260258 | A1 | 8/2020 | Desai |
| 2020/0304985 | A1 | 9/2020 | Gupta |
| 2020/0342086 | A1 | 10/2020 | Oung |
| 2020/0351818 | A1 | 11/2020 | Park |
| 2021/0076204 | A1* | 3/2021 | Goyal ................. H04L 67/306 |
| 2021/0174366 | A1* | 6/2021 | Zeng ................. G06Q 20/4016 |
| 2022/0004611 | A1 | 1/2022 | Whaley |
| 2022/0045852 | A1 | 2/2022 | Isshiki et al. |
| 2022/0075856 | A1 | 3/2022 | Whaley |
| 2022/0374864 | A1 | 11/2022 | Agarwal |
| 2023/0027202 | A1* | 1/2023 | Misra ................. G06Q 20/322 |

FOREIGN PATENT DOCUMENTS

| | | |
|---|---|---|
| KR | 20070121618 | 12/2007 |
| KR | 20080003760 | 1/2008 |

OTHER PUBLICATIONS

"Get Real-Time Feedback From Your Customers, without the Need for an Internet Connection" USSD Notifications HTTPS://txtnation.com/mobile-messaging/USSD-notifications/, accessed Jun. 9, 2021 5 pages, Doc 1170.

Carr, "Mobile Payment Systems and Services: An Introduction", Mobile Payment Forum, 2007, 12 pages, Doc 1171.

Karnouskos et al., "Mobile Payments: A journey through Existing Procedures and Standardization Initiatives," IEEE communications Surveys and Tutorials, Fourth Quarter, vol. 6, Nov. 2004, 23 pages, Doc 1172.

Petrova, "Mobile Payment: Towards a Customer-Centric Model", Web Information Systems Engineering—WISE Workshops, Sep. 2008, 13 pages, Doc 1173.

Rahimian, et al., "MPaySmart: A Customer Centric Approach in Offering Efficient Mobile Payments," IEEE Asia-Pacific Services Computing Conference, Dec. 2008, 6 pages, Doc 1174.

Soghoian, et al "Merx: Secure and Privacy Preserving Delegated Payments," Second International Trusted Computing Conference, Apr. 2009, 23 pages, Doc 1175.

U.S. Appl. No. 14/518,765 / Patent Application filed Oct. 20, 2014, 86 pages, Doc 1067.

(56) References Cited

OTHER PUBLICATIONS

U.S. Appl. No. 14/518,765 / Filing Receipt mailed Oct. 27, 2014, 4 pages, Doc 1068.
U.S. Appl. No. 14/518,765 / Notice of Publication mailed Apr. 21, 2016, 1 page, Doc 1069.
U.S. Appl. No. 14/518,765 / Non-Final Office Action mailed May 17, 2017, 49 pages, Doc 1070.
U.S. Appl. No. 14/518,765 / Response to Non-Final Office Action filed Jun. 9, 2017, 27 pages, Doc 1071.
U.S. Appl. No. 14/518,765 / Notice of Allowance mailed Oct. 11, 2017, 25 pages, Doc 1072.
U.S. Appl. No. 14/518,765 / Issue Fee Payment and 312 Amendment filed Jan. 10, 2018, 27 pages, Doc 1073.
U.S. Appl. No. 14/518,765 / Amendment After Allowance Initialed by Examiner mailed Jan. 16, 2018, 1 page, Doc 1074.
U.S. Appl. No. 14/518,765 / Issue Notification mailed Feb. 7, 2018, 1 page, Doc 1075.
U.S. Appl. No. 15/867,630, / US Application filed Jan. 10, 2018, 101 pages, Doc 1076.
U.S. Appl. No. 15/867,630, / Notice to File Missing Parts mailed Feb. 1, 2018, 3 pages, Doc 1077.
U.S. Appl. No. 15/867,630, / Filing Receipt mailed Feb. 1, 2018, 3 pages, Doc 1078.
U.S. Appl. No. 15/867,630, / Response to Missing Parts and Preliminary Amendment, filed Mar. 30, 2018, 22 pages, Doc 1079.
U.S. Appl. No. 15/867,630, / Updated Filing Receipt mailed Apr. 3, 2018, 4 pages, Doc 1080.
U.S. Appl. No. 15/867,630, / Notice of Publication mailed Jul. 12, 2018, 1 page, Doc 1081.
U.S. Appl. No. 15/867,630, / Non-Final Office Action mailed Oct. 11, 2018, 95 pages, Doc 1082.
U.S. Appl. No. 15/867,630, / Response to Non-Final Office Action filed Feb. 11, 2019, 27 pages, Doc 1084.
U.S. Appl. No. 15/867,630, / Final Office Action mailed Apr. 18, 2019, 28 pages, Doc 1085.
U.S. Appl. No. 15/867,630, / Response to Final Office Action and AFCP Request filed Jul. 18, 2019, 28 pages, Doc 1086.
U.S. Appl. No. 15/867,630, / Terminal Disclaimer filed and accepted Aug. 6, 2019, 7 pages, Doc 1087.
U.S. Appl. No. 15/867,630, / Notice of Allowance/Allowability mailed Aug. 20, 2019, 26 pages, Doc 1088.
U.S. Appl. No. 15/867,630, / Supplemental Notice of Allowability and Examiner Interview Summary mailed Nov. 6, 2019, 9 pages, Doc 1089.
U.S. Appl. No. 15/867,630, / Issue Fee Payment and 312 Response dated Nov. 11, 2019, 8 pages, doc 1090.
U.S. Appl. No. 15/867,630, / Supplemental Notice of Allowability and Examiner Interview Summary mailed Nov. 29, 2019, 10 pages, Doc 1091.
U.S. Appl. No. 15/867,630, / Issue Notification dated Dec. 18, 2019, 1 page, Doc 1092.
U.S. Appl. No. 16/691,490 / US Patent Application filed Nov. 21, 2019, 98 pages, Doc 1093.
U.S. Appl. No. 16/691,490 / Filing Receipt mailed Dec. 10, 2019, 5 pages, Doc 1094.
U.S. Appl. No. 16/691,490 / Non-final Office Action dated Aug. 6, 2020, 54 pages, Doc 1095.
U.S. Appl. No. 16/691,490 / Response to Non-final Office Action and Terminal Disclaimer dated Aug. 6, 2020, 23 pages, Doc 1096.
U.S. Appl. No. 16/691,490 / Final Office Action dated Jan. 14, 2021, 37 pages, Doc 1097.
U.S. Appl. No. 16/691,490 / Amendment and AFCP Request filed Mar. 15, 2021, 18 pages, Doc 1098.
U.S. Appl. No. 16/691,490 / Advisory Action mailed Mar. 22, 2021, 4 pages, Doc 1099.
U.S. Appl. No. 16/691,490 / Request for Continued Examination and Amendment filed Apr. 14, 2021, 21 pages, Doc 1100.
U.S. Appl. No. 16/691,490 / Office Action mailed May 24, 2021, 67 pages, Doc 1101.
U.S. Appl. No. 16/691,490 / Amendment filed Aug. 24, 2021, 17 pages, Doc 1102.
U.S. Appl. No. 16/691,490 / Notice of Allowance/Allowability dated Nov. 26, 2021, 18 pages, Doc 1103.
U.S. Appl. No. 16/691,490 / Request for Updated Filing Receipt filed Feb. 3, 2022, 18 pages, Doc 1104.
U.S. Appl. No. 16/691,490 / Updated Filing Receipt dated Feb. 8, 2022, 4 pages, Doc 1105.
U.S. Appl. No. 16/691,490 / Request for Corrected Filing Receipt dated Feb. 10, 2022, 26 pages, Doc 1106.
U.S. Appl. No. 16/691,490 / Corrected Filing Receipt dated Feb. 14, 2022, 4 pages, Doc 1107.
U.S. Appl. No. 16/691,490 / Issue Fee Payment and 312 Response filed Jan. 23, 2022, 6 pages, Doc 1108.
U.S. Appl. No. 63/134,914 / US Provisional Application filed Jan. 12, 2021, 67 pages, Doc 1109.
PCT Application PCT/US22/11725 / PCT Application filed Jan. 7, 2022, 61 pages, Doc 1112.
U.S. Appl. No. 17/225,964 / US Patent Application filed Apr. 8, 2021, 77 pages, Doc 1113.
U.S. Appl. No. 17/225,964 / Filing Receipt dated Apr. 16, 2021, 3 pages, Doc 1114.
U.S. Appl. No. 63/190,668 / US Provisional Application filed May 19, 2021, 63 pages, Doc 1115.
U.S. Appl. No. 63/190,668 / Corrected Filing Receipt dated Jul. 16, 2021, 3 pages, Doc 1116.
U.S. Appl. No. 17/410,918 / US Patent Application filed Aug. 24, 2021, 79 pages, Doc 1117.
U.S. Appl. No. 17/410,918 / Filing Receipt dated Sep. 3, 2021, 4 pages, Doc 1118.
U.S. Appl. No. 15/600,140 / US Patent Application filed May 19, 2017, 49 pages, Doc 1119.
U.S. Appl. No. 15/600,140 / Filing Receipt dated Jun. 5, 2017, 3 pages, Doc 1120.
U.S. Appl. No. 15/600,140 / Notice of Publication dated Nov. 23, 2017, 1 page, Doc 1121.
U.S. Appl. No. 15/600,140 / Restriction Requirement dated May 24, 2019, 6 pages, Doc 1122.
U.S. Appl. No. 15/600,140 / Response to Restriction Requirement dated May 28, 2019, 11 pages, Doc 1123.
U.S. Appl. No. 15/600,140 / Non-final Office Action dated Sep. 11, 2019, 11 pages, Doc 1124.
U.S. Appl. No. 15/600,140 / Terminal Disclaimer and Response to Non-final Office Action dated Dec. 11, 2019, 19 pages, Doc 1125.
U.S. Appl. No. 15/600,140 / Final Office Action dated Jan. 7, 2020, 19 pages, Doc 1126.
U.S. Appl. No. 15/600,140 / Terminal Disclaimer, Request for Continued Examination and Amendment filed Apr. 7, 2020, 24 pages, Doc 1127.
U.S. Appl. No. 15/600,140 / Non-final Office Action dated Jun. 10, 2020, 21 pages, Doc 1128.
U.S. Appl. No. 15/600,140 / Response to Non-final Office Action dated Sep. 2, 2020, 15 pages, Doc 1129.
U.S. Appl. No. 15/600,140 / Final Office Action dated Dec. 2, 2020, 23 pages, Doc 1130.
U.S. Appl. No. 15/600,140 / Response to Final Office Action dated Dec. 28, 2020, 12 pages, Doc 1131.
U.S. Appl. No. 15/600,140 / Advisory Action dated Jan. 8, 2021, 6 pages, Doc 1132.
U.S. Appl. No. 15/600,140 / Request for Continued Examination and Amendment filed Jan. 15, 2021, 22 pages, Doc 1133.
U.S. Appl. No. 15/600,140 / Non-final Office Action dated Feb. 21, 2021, 22 pages, Doc 1134.
U.S. Appl. No. 15/600,140 / Response to Non-final Office Action filed Apr. 16, 2021, 16 pages, Doc 1135.
U.S. Appl. No. 15/600,140 / Notice of Allowance / Allowability dated Jul. 8, 2021, 16 pages, Doc 1136.
U.S. Appl. No. 15/600,140 / Issue Fee Payment and Request for Corrected Filing Receipt filed Oct. 8, 2021, 28 pages, Doc 1137.
U.S. Appl. No. 15/600,140 / Corrected Filing Receipt filed Oct. 12, 2021, 4 pages, Doc 1138.
U.S. Appl. No. 15/600,140 / Corrected Notice of Allowability dated Oct. 20, 2021, 5 pages, Doc 1139.

(56) References Cited

OTHER PUBLICATIONS

U.S. Appl. No. 15/600,140 / Issue Notification dated Oct. 27, 2021, 1 page, Doc 1140.
U.S. Appl. No. 17/527,083 / US Patent Application filed Nov. 15, 2021, 62 pages, Doc 1167.
U.S. Appl. No. 17/527,083 / Filing Receipt dated Nov. 30, 2021, pages, Doc 1168.
U.S. Appl. No. 17/527,083 / Notice of Publication dated Mar. 10, 2022, 1 page, Doc 1169.
U.S. Appl. No. 17/475,191 / US Divisional Patent Application filed Sep. 14, 2021, 61 pages, Doc 1141.
U.S. Appl. No. 17/475,191 / Filing Receipt datled Sep. 27, 2021, 4 pages, Doc 1142.
U.S. Appl. No. 17/475,191 / Notice of Publication dated Jan. 6, 2022, 1 page, Doc 1143.
U.S. Appl. No. 15/905,607 / US Patent Application filed Feb. 26, 2018, 58 pages, Doc 1144.
U.S. Appl. No. 15/905,607 / Filing Receipt mailed Mar. 23, 2018, 4 pages, Doc 1145.
U.S. Appl. No. 15/905,607 / Notice of Publication mailed Jun. 28, 2018, 1 page, Doc 1146.
U.S. Appl. No. 15/905,607 / Issue Fee Payment filed Nov. 6, 2018, 6 pages, Doc 1147.
U.S. Appl. No. 15/905,607 / Office Action mailed Nov. 14, 2019, 35 pages, Doc 1148.
U.S. Appl. No. 15/905,607 / Terminal Disclaimer and Amendment filed Feb. 14, 2020, 25 pages, Doc 1149.
U.S. Appl. No. 15/905,607 / Final Office Action mailed May 14, 2020, 30 pages, Doc 1150.
U.S. Appl. No. 15/905,607 / Request for Continued Examination and Amendment filed Aug. 13, 2020, 26 pages, Doc 1151.
U.S. Appl. No. 15/905,607 / Notice of Allowance/Allowability mailed Sep. 25, 2020, 22 pages, Doc 1152.
U.S. Appl. No. 15/905,607 / Issue Fee Payment filed Nov. 6, 2020, 6 pages, Doc 1153.
U.S. Appl. No. 15/905,607 / Issue Notification mailed Nov. 24, 2020, 1 Page., Doc 1154.
U.S. Appl. No. 16/385,776 / US Patent Application filed Apr. 16, 2019, 46 pages, Doc 1155.
U.S. Appl. No. 16/385,776 / Filing Receipt mailed Apr. 30, 2019, 5 pages, Doc 1156.
U.S. Appl. No. 16/385,776 / Notice of Publication mailed Aug. 8, 2019, 1 page, Doc 1157.
U.S. Appl. No. 16/385,776 / Office Action mailed Nov. 19, 2020, 42 Pages, Doc 1158.
U.S. Appl. No. 16/385,776 / Amendment filed Dec. 28, 2020, 22 pages, Doc 1159.
U.S. Appl. No. 16/385,776 / Final Office Action mailed Mar. 29, 2021, 38 pages, Doc 1160.
U.S. Appl. No. 16/385,776 / Request for Continued Examination and Amendment filed Jun. 4, 2021, 26 pages, Doc 1161.
U.S. Appl. No. 16/385,776 / Office Action mailed Sep. 15, 2021, 34 pages, Doc 1162.
U.S. Appl. No. 16/385,776 / Response to Office Action filed Dec. 15, 2021, 23 pages, Doc 1163.
U.S. Appl. No. 16/385,776 / Examiner Interview Summary dated Jan. 5, 2022, 2 pages, Doc 1164.
U.S. Appl. No. 16/385,776 / Terminal Disclaimer and Reuest for Corrected Filing Receipt filed Jan. 6, 2022, 26 pages, Doc 1165.
U.S. Appl. No. 16/385,776 / Notice of Allowance/Allowability dated Feb. 2, 2022, 9 pages, Doc 1166.
U.S. Appl. No. 17/674,627 / Terminal Disclaimer filed May 26, 2023, 5 pages, Doc 1904.
U.S. Appl. No. 17/674,627 / Notice of Allowance and Allowability dated Jun. 8, 2023, 20 pages, Doc 1905.
U.S. Appl. No. 18/188,847 / Non-Final Office Action dated Jun. 21, 2023, 22 pages, Doc 1906.
U.S. Appl. No. 18/188,847 / Notice of Publication issued Jul. 20, 2023, 1 page, Doc 1907.
U.S. Appl. No. 17/225,964 / Response to Final Office Action & AFCP Request filed May 3, 2023, 23 pages, Doc 1908.
U.S. Appl. No. 17/225,964 / Advisory Action issued Jun. 2, 2023, 10 pages, Doc 1909.
U.S. Appl. No. 17/225,964 / RCE & Amendment filed Jul. 3, 2023, pages 27, Doc 1910.
U.S. Appl. No. 17/410,918 / Non-Final Office Action issued Jun. 1, 2023, 52 pages, Doc 1911.
PCT Application PCT/US2022/011725 / Demand & Response to Written Opinion filed Oct. 31, 2022, 14 pages, Doc 1876.
PCT Application PCT/US2022/023938 / PCT Application filed Apr. 7, 2022, 71 pages, Doc 1875.
PCT Application PCT/US2022/023938 / International Search Report and Written Opinion dated May 17, 2022, 11 pages, Doc 1874.
Matsunaka et al., "Device Authentication and Registration Method Assisted by a Cellular System for User-driven Service Creation Architecture"; https://ieeexplore.ieee.org/document/478473, 2009 6th IEEE Consumer Communications and Networking Conference; Jan. 10-13, 2009, 5 pages, Doc 1849.
PCT Application No. PCT/US2022/029852 / International Search Report and Written Opinion dated Oct. 6, 2022, 12 pages, Doc 1850.
U.S. Appl. No. 17/674,627 / Non-Final Office Action dated Nov. 10, 2022, 21 pages, Doc 1851.
U.S. Appl. No. 17/225,964 / Notice of Publication dated Oct. 13, 2022, 1 page, Doc 1852.
U.S. Appl. No. 16/691,490 / Issue Notification dated Mar. 16, 2022, 1 page, Doc 1815.
U.S. Appl. No. 17/674,627 / Patent Application filed Feb. 17, 2022, 88 pages, Doc 1816.
U.S. Appl. No. 17/674,627 / Filing Receipt and Notice to File Missing Parts dated Feb. 25, 2022, 6 pages, Doc 1817.
U.S. Appl. No. 17/674,627 / Preliminary Amendment and Response to Notice to File Missing Parts filed Apr. 14, 2022, 13 pages, Doc 1818.
U.S. Appl. No. 17/674,627 / Updated Filing Receipt dated Apr. 18, 2022, 4 pages, Doc 1819.
PCT Application PCT/US22/11725 / International Search Report and Written Opinion dated Mar. 30, 2022, 15 pages, Doc 1820.
U.S. Appl. No. 17/225,964 / Non-final Office Action dated May 2, 2022, 32 pages, Doc 1821.
U.S. Appl. No. 17/225,964 / Examiner Interview Summary dated May 27, 2022, 3 pages, Doc 1822.
U.S. Appl. No. 17/747,214 / Patent Application filed May 18, 2022, 63 pages, Doc 1823.
U.S. Appl. No. 17/747,214 / Filing Receipt dated May 24, 2022, 3 pages, Doc 1824
PCT/US22/29852 / PCT Application filed May 18, 2022, 61 pages, Doc 1825.
U.S. Appl. No. 16/385,776 / Issue Fee Payment and 312 Amendment filed Apr. 28, 2022, 20 pages, Doc 1826.
U.S. Appl. No. 16/385,776 / Examiner Response to 312 Amendment dated May 4, 2022, 3 pages, Doc 1827.
U.S. Appl. No. 16/385,776 / Issue Notification dated Jun. 1, 2022, 1 page, Doc 1828.
U.S. Appl. No. 17/674,627 / Notice of Publication dated Jul. 28, 2022, 1 page, Doc 1836.
U.S. Appl. No. 17/225,964 / Response to Non-Final Office Action filed Jun. 6, 2022, 11 pages, Doc 1838.
U.S. Appl. No. 17/225,964 / Non-Final Office Action dated Aug. 24, 2022, 19 pages, Doc 1839.
U.S. Appl. No. 17/674,627 / Response to Non-Final Office action dated Feb. 10, 2023, 12 pages, Doc 1884.
U.S. Appl. No. 18/188,847 / US Patent Application filed Mar. 23, 2023, 80 pages, Doc 1885.
U.S. Appl. No. 17/225,964 / Response to Non-Final Office Action filed Nov. 23, 2022, 15 pages, Doc 1887.
U.S. Appl. No. 17/225,964 / Final Office Action dated Mar. 3, 2023, 33 pages, Doc 1886.
U.S. Appl. No. 17/410,918 / Notice of Publication dated Mar. 2, 2023, 1 page, Doc 1888.

(56) References Cited

OTHER PUBLICATIONS

U.S. Appl. No. 18/188,847 / Filing Receipt and Informational Notice to Applicant dated Jan. 14, 2023, 5 pages, Doc 1893.

* cited by examiner

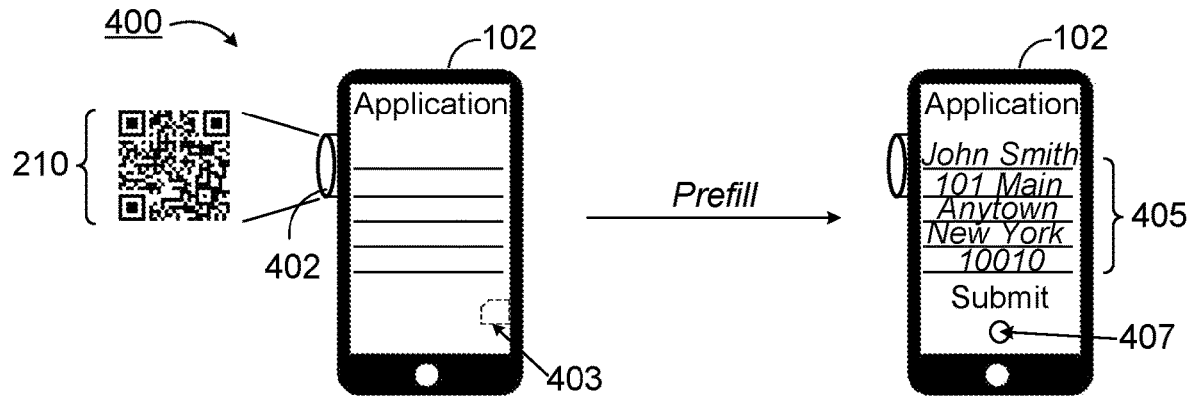
FIG. 4A  FIG. 4B
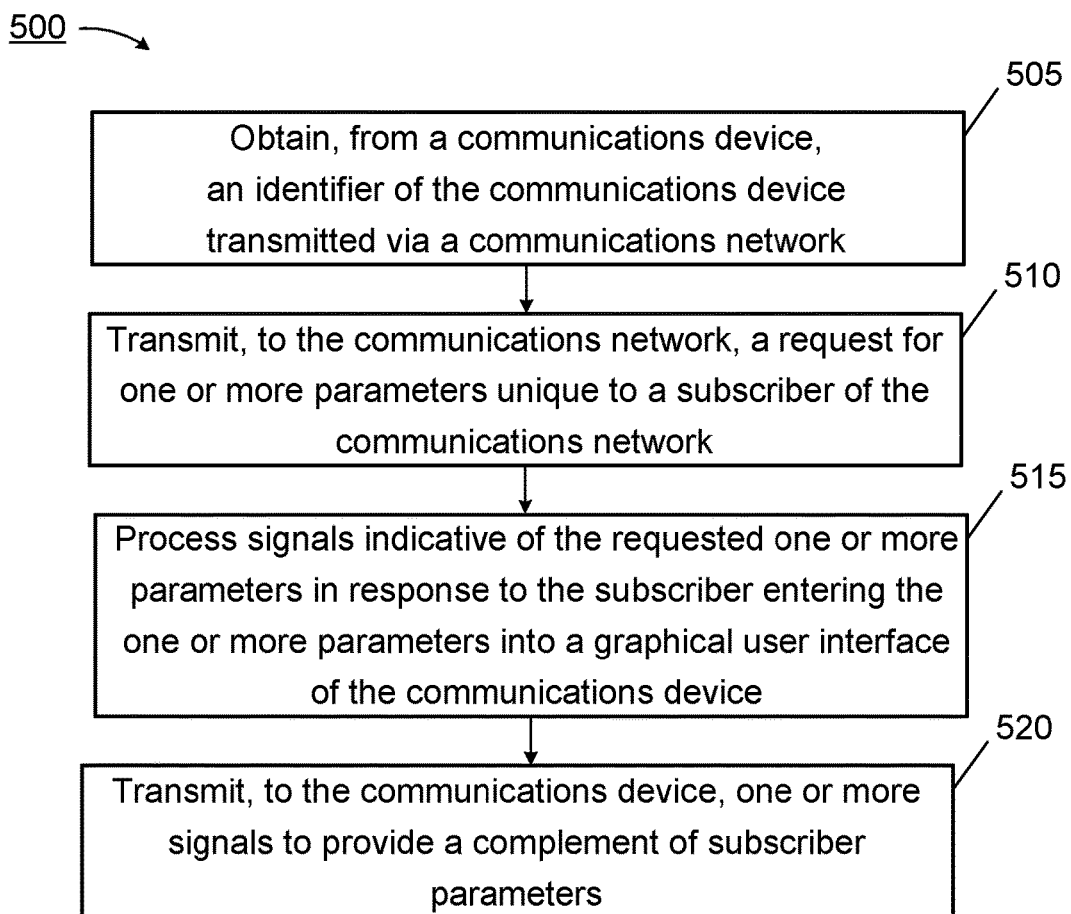
FIG. 5

TRANSMITTING A COMPLEMENT OF USER PARAMETERS TO A COMMUNICATIONS DEVICE

CROSS-REFERENCE TO RELATED APPLICATIONS

This application claims priority to U.S. provisional patent application No. 63/134,914, filed Jan. 7, 2021, which is incorporated by reference in its entirety and for all purposes.

BACKGROUND

1. Field

The present disclosure relates generally to approaches for receiving signals, at a communications device, which relate to parameters of a subscriber co-located with the communications device, in which at least certain parameters are to be displayed on a user interface of the device.

2. Information

The World Wide Web or simply the Web, as provided by the Internet, has grown rapidly in recent years at least partially in response to the relative ease by which a wide variety of types of transactions can be performed or enabled via the Internet. As a consequence of widely available Internet connections, including connections to the Internet facilitated by mobile cellular communication services, a mobile subscriber may shop and/or browse for virtually any product and/or service utilizing a mobile communications device. Further, it may be appreciated that such an ability to shop and/or browse via a mobile communications device may involve only a portion or aspect of an overall mobile device-facilitated shopping ecosphere. Other aspects of a device-facilitated shopping ecosphere involve an ability to apply for and to obtain credit that can be used for the purchase of goods and services, and so forth.

However, it may also be appreciated that certain types of mobile communications devices, such as handheld mobile cellular telephones, tablet computing devices, and other mobile communications devices that operate without suitably-sized keyboard, for example, may present data-entry challenges to users. For example, a subscriber attempting to complete an application for credit utilizing a handheld mobile communications device (e.g., a smart phone, tablet computing device, etc.) may find it time-consuming and frustrating to enter a name, current address, past address(es), present employer, past employer(s), credit history, etc., utilizing a small touchscreen. Further, such data entry, utilizing small-form keyboards/keypads, may easily introduce errors which may, in turn, bring about the need for a subscriber to re-enter personal data so that the credit application, for example, can be completed. Thus, attempts to increase the ease and efficiency by which users can enter parameters into smaller-sized keyboards/keypads of, for example, handheld mobile communications devices, continues to be an active area of investigation.

SUMMARY

One general aspect concerns a method, which includes obtaining, from a communications device, an identifier of the communications device transmitted via a communications network. The method also includes transmitting, to the communications network, a request for one or more parameters unique to a subscriber of the communications network. The method also includes processing signals indicative of the requested one or more parameters in response to the subscriber entering the one or more parameters into a graphical user interface of the communications device. The method also includes transmitting, to the communications device, one or more signals to provide a complement of subscriber parameters.

Particular embodiments of the method may further include receiving a captured image of one or more machine-readable layouts, via the communications device, prior to transmitting the identifier. In particular embodiments, the one or more machine-readable layouts are arranged as a quick response (QR) code. In particular embodiments, the identifier of the communications device may be obtained in response to accessing a subscriber identity module (SIM) of a communications device. In particular embodiments, the identifier of the communications device may include an international mobile subscriber identifier (IMSI), an international mobile electronic identifier (IMEI), or a mobile station international subscriber directory number (MSISDN), or any combination thereof. In particular embodiments, the communications network forms a part of a mobile cellular communications network. In particular embodiments, the one or more parameters unique to the subscriber includes at least one of a portion of a social security number and a date-of-birth. Particular embodiments may include transmitting to the communications device, one or more numerical values to the subscriber. In particular embodiments, the one or more numerical values may correspond to a credit value requested by the subscriber. In particular embodiments, the one or more numerical values may include a credit limit and/or an incentive amount. In particular embodiments, the complement of subscriber parameters includes, at least, a physical address of the subscriber.

Another general aspect refers to an apparatus that includes a processor coupled to a memory to initiate reception of an authentication request, transmitted by a subscriber co-located with a communications device, to populate a graphical user interface of the communications device with a complement of parameters indicative of the subscriber. The apparatus is also to initiate access of a data store to determine, responsive to receipt of the authentication request, in which the complement of parameters is indicative of the subscriber co-located with the communications device. The apparatus is also to initiate transmission of the complement of parameters indicative of the subscriber to the communications device.

In particular embodiments, the processor coupled to the memory is additionally to initiate determination of a measure of trust corresponding to the communications device in response to one or more accesses of the data store. In particular embodiments, the processor coupled to the memory is additionally to initiate processing of signals that represent a captured image of one or more machine-readable layouts transmitted by the communications device. In particular embodiments, the transmission initiated by the processor includes one or more signals indicative of a physical address of the subscriber. In particular embodiments the authentication request includes parameters indicative of an image of a quick response (QR) code captured by an imaging device accessible to the communications device. In particular embodiments, the authentication request includes an international mobile subscriber identifier (IMSI), an international mobile electronic identifier (IMEI), or a mobile subscriber international subscriber identification number (MSISDN), or any combination thereof.

Another general aspect refers to an article including a non-transitory storage medium having instructions stored thereon executable by a special-purpose computing platform to receive signals indicative of an identifier of a communications device from a communications network. The executable instructions may be additionally to bring about transmission, to the communications network, of a request for one or more parameters unique to a subscriber of the communications network. The executable instructions are additionally to bring about reception, from the communications network, of signals indicative of the requested one or more parameters. The executable instructions may be additionally to bring about transmission, to a mobile communications device, of one or more signals indicative of a complement of parameters indicative of the subscriber.

In particular embodiments, the complement of parameters of the subscriber includes parameters indicative of a physical address of to the subscriber. The non-transitory storage medium includes instructions to determine a measure of trustworthiness of the communications device. In particular embodiments, the complement of parameters indicative of the subscriber may be accompanied by one or more numerical values transmitted to the subscriber. In particular embodiments, the one or more numerical values transmitted to the subscriber may include a credit value requested by the subscriber and/or an incentive amount. In particular embodiments, the communications network forms part of a mobile cellular communications network.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

FIG. 4A shows a communications device displaying an interface to accept a complement of subscriber parameters, according to an embodiment.

FIG. 4B shows a communications device displaying a user interface into which a complement of subscriber parameters has been pre-filled into the user interface, according to an embodiment.

FIG. 5 shows a process of transmitting a complement of subscriber parameters to a communications device, according to an embodiment.

Figure 1:
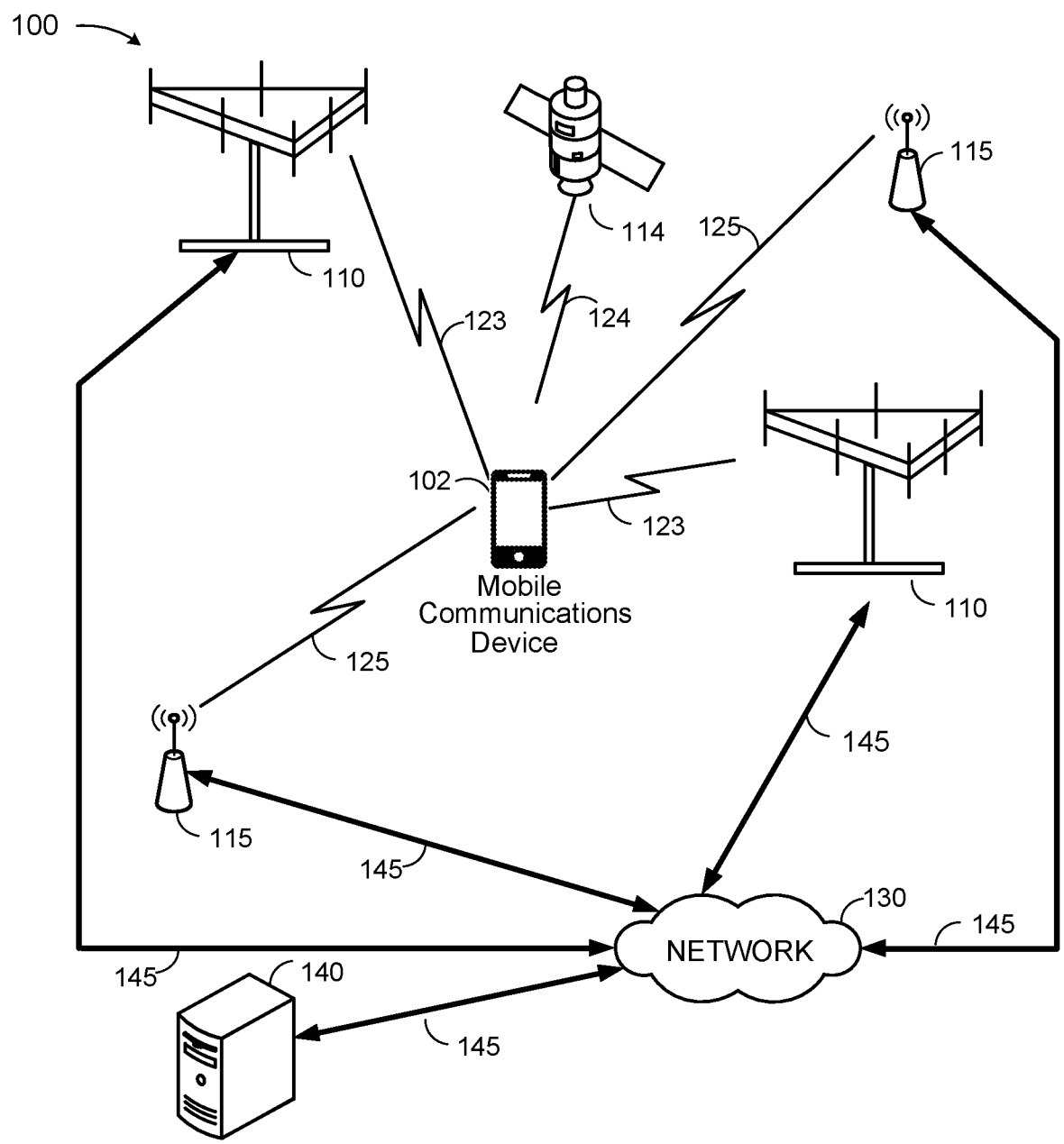
FIG. 1 is a diagram of a communications device situated within a cellular communications infrastructure, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, in an environment in which electronic communication devices, mobile cellular telephones, voice over Internet protocol (VoIP) communications devices, etc., have become ubiquitous, a communications device subscriber may wish to perform an electronic or digital transaction. Such electronic or digital transactions may comprise completing an application for credit, engaging in an electronic financial transaction, purchasing a product or service, applying for a loan, completing one or more forms of an application for healthcare or while visiting a health provider's office, and completing many other types of electronic documents. To facilitate such transactions, a subscriber co-located with a personal electronic communications device may establish an identity, such as may be established in connection with an electronic communications device subscriber account, such as with a cellular or mobile communications device services carrier, a VoIP services provider, or with any other type of communication services carrier. Establishment of an device subscriber account for use with a communications device, utilizing, for example, a subscriber account identifier, may permit the identity of an subscriber attempting to engage in an electronic or digital transaction to be authenticated, authorized, and/or verified. In some instances, given the nature of electronic or digital transactions, such as in an environment in which electronic or digital transactions may be initiated via a communications device at any time and at any location, it may be useful to be able to verify and/or authenticating the subscriber relatively quickly, such as in a real-time or near-real-time manner.

As a general matter, verification of a transacting party, such as via use of a communications device, may be desirable in response to an institution or organization (e.g., third party, etc.) seeking to determine the identity of a transacting party (e.g., a mobile subscriber). Verification of a transacting party may involve establishing a correspondence and/or association of the transacting party with a persistent subscriber account identifier, as demonstrated below through illustrative examples. In this context, a correspondence, association, and/or similar terms refer to a persistent, continuing and objectively verifiable relationship between a transacting party in possession of, for example, a particular communications device (such as a mobile communications device). Thus, a unique subscriber account identifier may be employed to signify and/or identify a particular transacting party. In this context, the term "mobile communications device identity" and/or similar terms refer to an identity that relies on a mobile communications device account relationship (also referred to as a correspondence and/or association) of a subscriber as a source of authenticating, authorizing, and/or verifying a transacting party and is capable of being verified by another (e.g., a third-party auditing, authorizing and/or verifying entity). The term "mobile subscriber device account" and/or similar terms in this context refer to a mobile communication services provider account. The terms "mobile communications device services provider," "mobile communications device carrier," "mobile network operator" may be used interchangeably. Furthermore, in this context, the term "mobile device services carrier," "telecommunication services carrier," "service carrier," or simply "carrier" may refer to an entity of a communications infrastructure that provides wired and/or wireless communication services to the general public for a consideration, such as a monthly subscription fee.

Thus, a carrier (e.g., a telecommunication services carrier) may comprise a mobile communication services provider and/or mobile network operator. However, there are examples of carriers that may not correspond to mobile communications device services providers and/or mobile network operators. Such instances may include wireline services providers (for example, providers of services operating within the public switched telephone network or PSTN), which include wireline services for rotary dial telephones and/or telephones utilizing, for example, dual tone multi-frequency (DTMF) signaling. Accordingly, the terms "services carrier" or simply "carrier" may be used in place of a communication services carrier, such as a provider of mobile communication services and/or wireline telephone services provider without a loss in meaning and/or understanding. In a given situation, particular context of usage indicate if a term is being used in its most general sense or in a narrow sense, such as referring to a mobile communications device services provider, wireline services provider, mobile paging services provider, or mobile network operator, for example.

It is noted that while a correspondence or association between a transacting party and a communications device need not be long-term, such correspondence or association between a transacting party and a communications device should imply some amount of persistence to be of use in this context. Other aspects of verifying and/or authenticating a mobile subscriber are described in greater detail later. For example, in an embodiment, verifying and/or authenticating a transacting party may relate to an account (e.g., a mobile account) and a subscriber (e.g., a mobile subscriber). Further, a subscriber account is one example of a type of subscriber account, especially in a networked electronic commerce environment, although claimed subject matter is not intended to be limited to online accounts or to mobile accounts. Rather, the term "account" or "subscriber account" in this context refers to a formal business arrangement between an entity, person, or other type of transacting party, and a provider of the account in order to accomplish a business purpose, for example. The term "account" is intended to be broadly interpreted as an arrangement that provides certain privileges. In this context, such privileges may involve access to credit, so as to permit the purchase of goods or services, access to privileged content, such as premium entertainment content (e.g., premium sports, cinema, or other entertainment content). Also in this context, the term "privileged content" is intended to be interpreted broadly and to encompass any type of content available exclusively to certain individuals and/or certain entities in response to supplying certain credentials. Also in this context the term "parameter" refers to a numerical or other measurable factor capable of defining a system and/or sets conditions for operation of a system. Thus, for example, a set of parameters may include data or information stored via a non-transitory memory that form or define, at least in part, an electronic representation of the state of a subscriber.

Likewise, an account may comprise attributes associated with or corresponding to the account. In this context, the term "subscriber account identifier" refers to a unique descriptor or feature associated with the account that defines certain aspects of the account. For example, as nonlimiting illustrations, with respect to a mobile device subscriber, a subscriber account identifier may include a mobile telephone number, a mobile subscriber-unique alias, an international mobile subscriber identifier (IMSI), Integrated Circuit Card Identifier (ICC ID), a mobile services and/or other type of identifier (e.g., a unique identifier) employed in connection with the particular mobile network operator or the mobile communication services provider. Mobile communications networks may include those compatible or compliant with a Global System for Mobile Communications (GSM) communications network, for example. Other examples of mobile subscriber account identifiers may include an International Mobile Equipment Identifier (IMEI), Mobile Station International Subscriber Directory Number (MSISDN), a mobile equipment identifier or any other identifier a mobile billing account number/identifier.

As discussed herein, a subscriber co-located with a communications device may apply for an account, such as a credit account, for example, or any other type of account that imparts or confers particular privileges to the subscriber. In many instances, to obtain such privileges, a communications device subscriber may be required to complete an application, such as an application for an account, an application for credit, and application for an increase in credit, or any other type of formal request involving the subscriber supplying subscriber-specific information, data, parameters, and so forth. However, as previously alluded to, completing an application for such privileges (e.g., a line of credit) may involve the subscriber interacting with a user interface of a communications device having a small-form keyboard, keypad, etc. Such data entry, utilizing small-form keyboards/keypads, may easily introduce errors which may, in turn, bring about the need for a subscriber to re-enter personal data so that the credit application, for example, can be completed.

Thus, in particular embodiments, a complement of subscriber-specific parameters may be conveyed to a communications device, so as to facilitate the relatively effortless completion of various user interface activities. For example, as may be involved in the completion of a credit application, a subscriber may be requested to enter a complement of parameters into an online application via a communications device. In certain embodiments, a subscriber faced with the task of entering a complement of subscriber-specific parameters (e.g., name, address, Social Security number, date-of-birth, past/present addresses, past/present employers, etc.) may need only engage in a few simple operations, via a communications device, so that a user interface (e.g., a graphical user interface) of the communications device may be populated or pre-filled with a complement of subscriber-specific parameters. In particular embodiments, an authenticator may access a centralized repository subscriber parameters so that a complement of subscriber parameters may be transmitted to the communications device. In particular embodiments, transmission of a complement of subscriber parameters, or significant portion thereof, may be automatically (e.g., without subscriber input) transmitted to a subscriber's communications device. A communications device may operate to automatically (e.g., without subscriber input) pre-fill, for example, a credit application. Transmission of a complement of subscriber parameters to a mobile communications device may involve conveying subscriber-specific parameters accessed from the centralized repository to the subscriber's mobile communications device.

In particular instances, transmission of a complement of subscriber parameters to a communications device from a centralized repository may occur responsive to capturing an image of a machine-readable layout (e.g., a quick response or "QR" code). Responsive to capturing such an image, one or more processors of a communications device (e.g., a mobile communications device) may access a memory area of the communications device (e.g., memory area within a subscriber identity module or "SIM"). Following such access, parameters accessed from or derived from the SIM can be transmitted to an identity verification service. An identity verification service may compile, such as from the centralized repository, the complement of subscriber parameters based, at least in part, on the parameters accessed from or derived from the SIM of the communications device. The complement of subscriber parameters may be transmitted to the communications device via a communications network. Following receipt of the complement of subscriber parameters, fields of an online application for credit, for example, can be populated or pre-filled with subscriber-specific parameters. A complement of such subscriber parameters transmitted to a communications device may give rise to the device populating or pre-filling, for example, an application (such as a credit application), which may be displayed on the display of the communications device. Consequently, the subscriber can quickly, and with minimal effort, complete an application for credit, obtain an increase in credit, obtain an incentive from a participating credit-issuing, for example. Further, by pre-filling a complement of subscriber parameters on a display of a communications device, data entry errors, typographical errors, errors in punctuation and syntax, can be avoided so that a prospective account holder can be assured of a positive initial experience with a merchant or other institution. In particular embodiments, applications for credit from a financial institution, merchant, or other type of institution may be accompanied by the institution providing an incentive bonus or an incentive award, for example, based on subscriber-unique parameters, as discussed further hereinbelow.

Some example methods, apparatuses, and/or articles of manufacture are disclosed herein that may be used, in whole or in part, to facilitate and/or support one or more operations and/or techniques that relate to transmitting a complement of subscriber parameters to a communications device. A complement of subscriber parameters transmitted to a communications device may enable the device to populate or pre-fill, for example, an application (such as a credit application), which may be displayed on the display of the communications device. Such techniques may be implemented in connection with a processor-equipped cellular mobile communications device communicating with one or more computing devices via the one or more communication networks (such as cellular communications networks) utilizing one or more communications protocols discussed herein.

In this context, the term "article" refers to an article of manufacture as well as a data or memory structure having instructions stored thereon. The communications device may be utilized to verify and/or authenticate a transacting party, such as a party interacting with a communications device to complete an application, such as an application for credit. Such electronic or on-line transactions, which may herein be referred to as simply "transactions," may involve transactions related to one or more financial accounts, such as accounts that relate to a line of credit, a communication device services account (e.g. associated with a mobile communications device), a bank account, a brokerage account, and so forth. In this context, a "transacting party" refers to an entity, such as an individual subscriber, who may attempt to engage in, and/or facilitate, an electronic or on-line transaction.

Although the discussion that follows relates to any type of account, as a non-limiting illustration, accounts related to mobile communications devices may be used for illustration. However, it is understood, of course, that claimed subject matter is intended to not be limited to examples provided primarily for purposes of illustration, since such examples may be oversimplified for purposes of comprehension, for example.

FIG. 1 is a diagram of a communications device situated within a cellular communications infrastructure, according to various embodiments. In FIG. 1 (embodiment 100) communications 102 may transmit radio signals to, and receive radio signals from, a wireless communications network. In an example, communications device 102 may communicate with a cellular communications network by transmitting wireless signals to, and/or receiving wireless signals from, a cellular transceiver 110, which may comprise a wireless base transceiver subsystem (BTS), a Node B or an evolved NodeB (eNodeB), over wireless communication link 123. Similarly, communications device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a communications device over a wireless link, and claimed subject matter is not limited in this respect. In particular embodiments, cellular transceiver 110, local transceiver 115, and satellite 114 represent touchpoints, which permit device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communications device 102 at a call source and server 140 through local transceiver 115 or cellular transceiver 110. In an embodiment, network 130 may also facilitate communication between communications device 102, server 140 and a public switched telephone network, for example, through a suitable communications link. In another implementation, network 130 may comprise a cellular communication network infrastructure such as, for example, a base station controller or packet based or circuit based switching center (not shown) to facilitate cellular communication with communications device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communications device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communications device 102 and cellular transmitter 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, communications device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of communications device 102 based on these location related measurements. In some implementations, location related measurements obtained by communications device 102 may be transferred to a location server such as an enhanced serving mobile location center (E-SMLC) or SUPL location platform (SLP) (e.g. which may comprise a server, such as server 140) after which the location server may estimate or determine an estimated location for communications device 102 based on the measurements. In the presently illustrated example, location related measurements obtained by communications device 102 may include measurements of signals (124) received from satellites belonging to an SPS or Global Navigation Satellite System (GNSS) such as GPS, GLONASS, Galileo or Beidou and/or may include measurements of signal strengths of signals utilized in wireless communication links 123 and/or 125 received from terrestrial transmitters fixed at known locations (e.g., such as cellular transceiver 110).

Communications device 102 or a separate location server may obtain a location estimate for communications device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at communications device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communications device 102. Here, server 140 may be capable of providing positioning assistance data to communications device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communications device 102 may obtain measurements of signal strengths for signals received from cellular transceiver 110 and/or local transceiver 115 and/or may obtain a round trip signal propagation time (RTT) between communications device 102 and a cellular transceiver 110 or local transceiver 115. A communications device 102 may use these measurements together with assistance data (e.g. terrestrial almanac data or GNSS satellite data such as GNSS Almanac and/or GNSS Ephemeris information) received from server 140 to determine a location estimate for communications device 102 or may transfer the measurements to server 140 to perform the same determination. A call from communications device 102 may be routed, based on the location of communications device 102, and connected to the public switched telephone network, for example, via wireless communication link 123 and/or other communications links.

A communicating device at a call source (e.g., communications device 102 of FIG. 1) may be referred to by any name corresponding to a cellphone, smartphone, laptop, tablet, PDA, tracking device or some other portable or movable device. Typically, though not necessarily, a communications device may support wireless communication such as using GSM, WCDMA, LTE, CDMA, HRPD, WiFi, BT, WiMax, etc. A communications device may also support wireless communication using a wireless LAN (WLAN), DSL or packet cable for example. A communications device may comprise a single entity or may comprise multiple entities such as in a personal area network where a subscriber may employ audio, video and/or data I/O devices and/or body sensors and a separate wireline or wireless modem. An estimate of a location of a communications device (e.g., communications device 102) may be referred to as a location, location estimate, location fix, fix, position, position estimate or position fix, and may be geographic, thus providing location coordinates for the communications device (e.g., latitude and longitude) which may or may not include an altitude component (e.g., height above sea level, height above or depth below ground level, floor level or basement level).

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
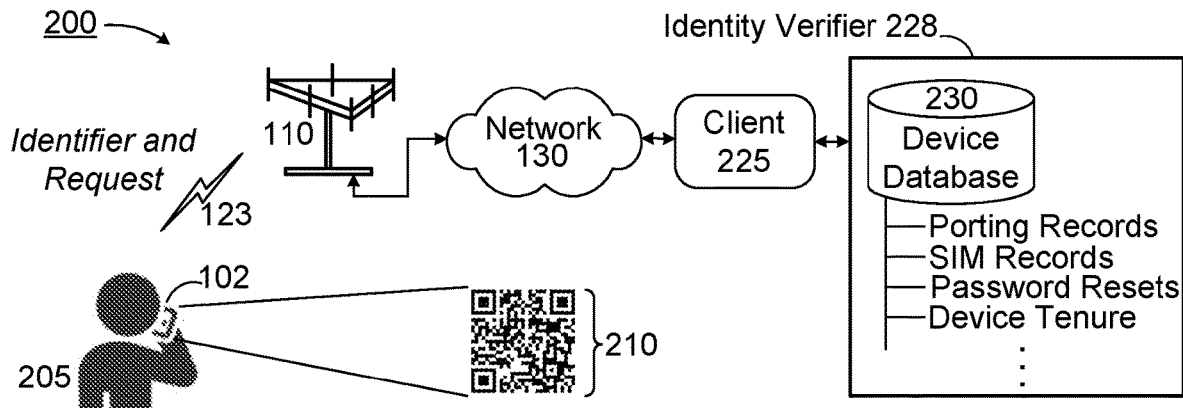
FIG. 2 shows a subscriber interacting with an aspect of a cellular communications network, within a cellular communications infrastructure, to obtain a compliment of subscriber parameters, according to an embodiment.

In view of the communications infrastructure shown and described in reference to FIG. 1, more particular embodiments directed toward transmitting a complement of subscriber parameters to a communications device are discussed hereinbelow. Hence, FIG. 2 shows a subscriber interacting with an aspect of a cellular communications network, within a cellular communications infrastructure, to obtain a compliment of subscriber parameters, according to an embodiment 200. In the embodiment of FIG. 2, subscriber 205 may be located at any point within cellular communications of cellular transceiver 110. In the embodiment of FIG. 2, subscriber 205 may be presently located in a department store, just as an example, within view of machine-readable layout 210. Machine-readable layout 210 may be positioned, for example, near a human-readable placard, which may advertise, just as an example, that a subscriber may obtain a credit card, for example, or other instrument, which may allow subscriber 205 to obtain a credit value (e.g., a credit limit) or other privileges at the department store. In particular embodiments, subscriber 205 may obtain any other type of numerical value (other than a credit value). Machine-readable layout 210 may represent a two-dimensional bar-code; however, in other embodiments, machine-readable layout 210 may represent any other type of machine-readable entity, such as a one-dimensional bar-code, or any other type of machine-recognizable or computer-recognizable pattern. Machine-readable layout 210 may be positioned nearby any other type of human-readable placard, for example, and claimed subject matter is not limited in this respect. In other instances, machine-readable layout 210 comprises a stand-alone machine-readable layout, presented on a placard, on the page of the magazine, or any other location readable by a camera device of communications device 102.

As shown in FIG. 2, subscriber 205 may situate communications device 102 so as to permit viewing and/or image capture of machine-readable layout 210 utilizing a camera of communications device 102. In the embodiment of FIG. 2, machine-readable layout 210 may be utilized in conjunction with a human-readable placard, which indicates to subscribers (e.g., subscriber 205), that a subscriber may initiate application for a credit account, for example, beginning with capturing an image of machine-readable layout 210, or by otherwise bringing machine-readable layout 210 into view of a camera of communications device 102. In the embodiment of FIG. 2, communications device 102 may execute a computer process, which may, in response to capturing or viewing an image of machine-readable layout 210, connect with a uniform resource locator (URL) via a browser operating on communications device 102. In some instances, the URL may correspond to a bank or other type of financial institution, which may permit subscriber 205 to complete an application for credit.

In addition to a browser program instructing communications device 102 to connect, via a browser, to a website corresponding to a bank or other type of financial institution, a computer process executing on device 102 may access a memory storage device, such as a SIM card, to obtain an identifier of the communications device. In particular embodiments, an identifier of a communications device may comprise a subscriber account identifier (e.g., a telephone number), International Mobile Subscriber Identifier (IMSI), an International Mobile Electronic Identifier (IMEI), or a Mobile Station International Subscriber Directory Number (MSISDN), or any combination thereof. An identifier of a communications device 102 may be transmitted to cellular transceiver 110 along with a request to initiate completion of a credit application, or an application to enter into any other type of agreement with, for example, a bank or financial institution.

As shown in FIG. 2, an identifier may be conveyed through one or more communication links, such as indicated by network 145. An identifier may be provided to client 225, which may correspond to a financial institution, such as a bank or any other institution. Responsive to receipt of an identifier, client 225 may query identity verifier 228, which may, in turn, access device database 230. In the embodiment of FIG. 2, device database 230 may include records of various deterministic events, such as records of number porting of communications device 102, records related to removal/replacement of a SIM, instances of password resets of a communications device, records of communications device tenure, and so forth. Device database 230 may include records that relate to other aspects of the behavior of subscriber 205 with respect to a communications device, and claimed subject matter is not limited in this respect. In addition to various historical events stored within device database 230, the database may include records referring to the "velocity" of a historical event, which may represent a rate or a frequency of occurrence of an online or off-line deterministic event with respect to time. For example, a subscriber's phone number-porting events may occur with a velocity of one event per one-year period. In other examples, deterministic events having a velocity aspect may refer to the rate (perhaps in occurrences per year) that a subscriber removes/replaces a SIM, replaces a communications device, resets or obtains a password, or may relate to any other online or off-line deterministic event. Further, various historical events stored within device database 230, with respect to communications device 102, may additionally pertain to browsing habits of subscriber 205, shopping habits of subscriber 205, and so forth.

In response to receipt of an identifier from communications device 102, via cellular transceiver 110, network 145, and client 225, identity verifier 228 may transmit a complement of subscriber parameters to client 225. In particular embodiments, identity verifier 228 may transmit a subscriber name, physical address (e.g., street address, city, town, municipality, ZIP Code, etc.) along with other subscriber parameters, which may include Social Security number. In other embodiments, identity verifier 228 may additionally transmit past physical addresses, current/past employer parameters, and a host of subscriber parameters, and claimed subject matter is not limited in this respect.

Following receipt of a complement of subscriber parameters, client 225 may transmit a request to communications device 102 for one or more additional identifying parameters. For example, an identifying parameter may comprise a Social Security number, or portion thereof (e.g., last four digits) for display to subscriber 205. Responsive to receipt of such request, subscriber 205 may enter the one or more additional identifying parameters (e.g., last four digits of Social Security number), which may operate to provide verification and/or authentication of subscriber 205. Following subscriber 205 entering the one or more additional identifying parameters into a user interface of communications device 102, the one or more additional identifying parameters may be transmitted, via communications link 123, cellular transceiver 110, and network 145 to client 225. Responsive to receipt of the one or more additional identifying parameters, client 225 may determine that subscriber 205 is the authentic (e.g., verified) owner of communications device 102, and/or that communications 102 is co-located with subscriber 205. Client 225 may make additional determinations based on the one or more additional identifying parameters, and claimed subject matter is not limited in this respect.

Client 225 may then transmit a complement of subscriber parameters for display utilizing a user interface of communications device 102. Accordingly, subscriber 205 may need only double check and/or verify that an application, such as an application for credit, has been pre-filled/populated by the parameters transmitted by client 225. At such point, subscriber 205 may perhaps depress a "submit" selector, which may, in turn, convey the pre-filled/populated credit application to client 225.

It may be appreciated that in the embodiment of FIG. 2, to complete an application, such as an application for credit, for example, subscriber 205 need only minimally interact with a communications device 102. For example, to initiate a process to complete an application, subscriber 205 may capture an image of machine-readable layout 210, which may correspond to a quick response (QR) code. Responsive to capture of the machine-readable layout, a memory device of communications device 102 may be queried, resulting in an identifier of device 102 being transmitted to cellular transceiver 110. In particular instances, transmission of an identifier of communications device 102 may be accompanied with an indication that subscriber 205 wishes to complete an application, such as a credit application. Following determination of parameters specific to subscriber 205, client 225 may request, at least in certain instances, a single parameter to be verified by subscriber 205 (e.g., last four digits of Social Security number). Responsive to confirmation of the single parameter by subscriber 205, a credit application may be pre-filled (e.g., pre-populated) with a complement of subscriber-specific parameters. In particular embodiments, subscriber 205 may simply select to "submit" the pre-filled credit application. Accordingly, in such a scenario, an application, such as a credit application, can be completed responsive to actuating six (6) selectors of a user interface of a cellular communications device, such as (selection 1) actuating a camera to capture an image of layout 210, (selections 2-5) entering four digits of a Social Security number, followed by (selection 6) actuating a "submit" selector.

Although not specifically discussed in reference to FIG. 2, following an identity verification process, such as involving identity verifier 228, the eligibility of subscriber 205 for pre-fill of a credit application, for example, may be determined. In an example, responsive to completion of an authentication process performed by an identity verifier, a complement of subscriber parameters may be transmitted to a communications device. Identity verification may take place utilizing one or more parameters stored in (or derived from) a SIM of a communications device, or may take place utilizing a subscriber's verified telephone number, a subscriber's persistent identifier, or utilizing any other type of subscriber account identification number. Alternatively, authentication of a communications device may take place responsive to an identity verifier transmitting a one-time short messaging system (SMS) passcode to a communications device. In such instances, an identity verifier may determine whether a subscriber is eligible for an automatic (e.g., without subscriber input) pre-fill of a form such as e-commerce checkout, digital sign-up, or an application for a service. In addition to determining whether a particular subscriber is eligible for pre-fill of a credit application, an identity verifier, cooperating with a computing resource of a credit issuer, may transmit one or more incentives to a subscriber, so as to entice the subscriber to complete and submit a credit application. In some instances, such incentives may be based, at least in part, on a subscriber's taxable income, discretionary income, demographics, credit history, credit score, spending history with a particular merchant, lifetime spending potential with a merchant, etc., and claimed subject matter is intended to embrace all such factors that may influence an incentive.

In particular embodiments, eligibility may be determined utilizing flexible, client-defined rules and/or guidelines. For example, eligibility for pre-fill of a form may be determined utilizing (but not limited to) criteria such as data attributes, which, for example, may include name/address, Social Security number, date-of-birth, household ID (e.g., last name of perhaps multiple subscribers living at a common physical address, etc. Eligibility for pre-fill of a form may also be dependent upon reputational scoring, which may correspond to the reputation of communications device 102 and/or subscriber 205. For example, a trustworthiness score or other measure of trustworthiness may be utilized in computing reputational scoring. Eligibility for pre-fill of a form may also be dependent upon demographic attributes of a subscriber, such as the subscriber's chronological age, ZIP Code of residence, taxable income, and so forth. Eligibility for pre-fill of a form may also be dependent upon parameters related to a communication services provider account, an account type, a device and/or subscriber account identifier (e.g., telephone number) tenure, trustworthiness score, etc. Eligibility for pre-fill of a form may also be dependent upon industry-specific attributes of a subscriber. For example, in an e-commerce environment, creating an account may involve, perhaps exclusively, parameters such as a subscriber name, address, phone number (or other type of subscriber account identifier, persistent identifier, subscriber-unique identifier, and so forth). In particular regulated industries, such as financial services or communication services carriers, creating an account may involve entry of parameters such as name, address, phone number (or other type of subscriber account identifier) Social Security number, date of birth, etc. Such parameters may fulfill know your customer (KYC) regulatory requirements for new account origination. Eligibility for pre-fill of a form may also utilize industry-specific scoring or computed metrics, which may include a lifetime value (e.g., covering a period of one year, two years, three years, etc.) based upon past transactional and/or purchase history. Such industry-specific scoring may include financial scoring such as credit-worthiness, whether at an individual level, and anonymized individual level, or at and anonymized aggregate level. Such industry-specific scoring may include behavioral interaction such as repeat visits, community engagement, or client-derived reputation scores. Eligibility for pre-fill of a form may include incentive scoring, which may relate to client-specified attributes and/or scoring, such as lifetime value or creditworthiness, which may result in client-specified incentives to be displayed with pre-fill or an automatic (e.g., without subscriber input) fill selector. In particular embodiments, providing such incentives may encourage a subscriber to complete, for example, a credit application in an e-commerce checkout or a digital sign-up application. Eligibility for pre-fill of a form may include geographic scoring, which may relate to whether a phone is currently located within a client-specific radius (e.g., 1 km, 5 km, 10 km, 25 km, 50 km, etc.) of a physical address associated with a communication services account or physical address (or sharing the same IP address as associated device such as a laptop, tablet, desktop or personal computer, smart TV, etc.

In particular embodiments, in response to determination of eligibility, a number of outcomes may result:

(1) Responsive to a subscriber being determined to be eligible, the pre-fill or auto-fill (e.g., without subscriber input) selector may be presented in a user interface of a communications device as an option to complete the form such as e-commerce checkout, digital sign-up, or application. Following selection of the selector, an identity verifier may fetch subscriber parameters from communications services providers, credit bureaus, and/or prepaid processors, etc., so as to complete a credit account application on behalf of the consumer.

(2) Responsive to a determination that a subscriber may not be eligible for pre-fill, there may be little or negligible interruption to the subscriber experience. In such a scenario, a pre-fill or auto-fill selector may not be displayed (or may be displayed as a grayed-out selection) in which the subscriber continues a checkout, digital sign-up, or applications.

(3) Responsive to a determination that a subscriber has been considered to be eligible, but does not choose a pre-fill or auto-fill option, the potential subscriber may choose to manually complete a form such as e-commerce checkout, digital sign-up, or application, whether the potential subscriber is eligible for the pre-fill experience. In such instances, an identity verifier may verify manually-entered parameters utilizing identity verification, in which parameters may be obtained from communication services providers, credit bureaus, and/or prepaid processors. In such instances, matching algorithms may be applied to parameters obtained utilizing, for example, fuzzy matching, gender, inversions, old but valid addresses, householding for family plans etc., and claimed subject matter is intended to embrace all such approaches.

In particular embodiments, following completion of the form, and following subsequent processing of the form, a client (e.g., an identity verifier) may utilize eligibility criteria to further simplify application processes. Such simplifications may be utilized by financial services institutions to provide access to a predetermined line of credit at account origination, a payment network adding a newly-obtained credit card directly to a mobile wallet for immediate use, a retailer offering an incentive for first time use of a new store private label or co-brand credit card, a mobile communication services provider offering a free or reduced-fee trial of new services such as music subscription, satellite radio, etc., and claimed subject matter is not limited in this respect.

As previously noted, client-specified incentives may be displayed with pre-fill or with an automatic fill selector (e.g., without user interface), which may encourage a subscriber to complete a credit application, for example. In particular embodiments, a client-specified incentive may include a numerical value corresponding to a predetermined bonus amount, for example, which may be given or awarded to the subscriber in response to the subscriber opening a credit account. A numerical value corresponding to a predetermined bonus amount may be awarded to a subscriber based, at least in part, on reported taxable income (or an estimate of taxable income), a subscriber's reported discretionary income (or an estimate of discretionary income), a measure of a subscriber's standing as an influencer of a social network (e.g., social network activity, number of followers, number of posts, etc.), marital status, Fair Isaac Corporation (FICO) score, and/or a measure of the subscriber's past spending history (or history of other engagements) with a certain merchant or with an affiliated merchant, an estimate of a subscriber's potential future (e.g., lifetime) spending with a certain merchant, a record of a subscriber having credit accounts with certain banks and/or lending institutions, etc. A numerical value of predetermined bonus award amount may be based on other factors and/or characteristics of a subscriber, and claimed subject matter is not limited in this respect.

Figure 3:
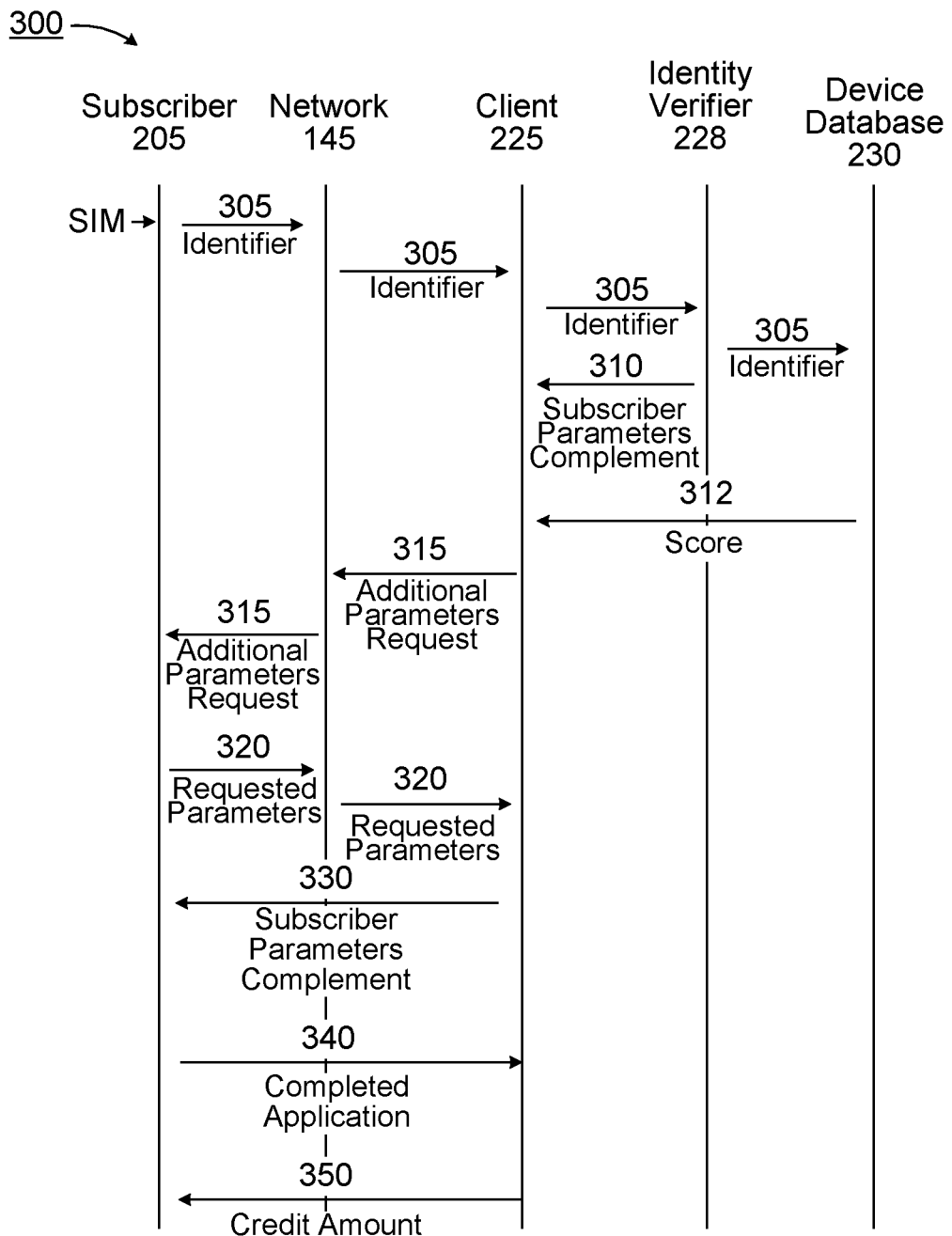
FIG. 3 shows a message flow diagram in a method of transmitting a complement of subscriber parameters to a communications device, according to an embodiment.

FIG. 3 shows a message flow diagram in a method of transmitting a complement of subscriber parameters to a communications device, according to an embodiment 300. The diagram of FIG. 3 begins with subscriber 205 interacting with a communications device, such as device 102 of FIG. 2, so as to access an identifier on a SIM of device 102. As described in FIG. 2, an identifier stored on a SIM may be accessed responsive to a camera of communications device 102 capturing an image of machine-readable layout 210. As mentioned with respect to FIG. 2, capture of machine-readable layout 210 may permit communications device 102 to connect (e.g., via a browser-based session) with a bank or other type of financial institution to permit subscriber 205 to complete an application for credit, apply for increased credit, or initiate any other application for a privilege to be granted (e.g., borrowing funds, obtaining a line of credit, etc.).

Responsive to identifier 305 being accessed from a SIM of a communications device, perhaps in response to subscriber 205 capturing an image of machine-readable layout 210, identifier 305 may be conveyed via link 123 (of FIG. 2) through cellular transceiver 110, and through network 130. Identifier 305 may then be presented to client 225, which may represent a bank, credit union, or other type of institution capable of providing loans, lines of credit, access to privileged/premium content (e.g., for a fee), etc. Client 225 may pass identifier 305 to identity verifier 228. Identity verifier 228 may, in turn, access device database 230, which may provide complement 310 (e.g., name, current/past addresses, current/past employers, phone number, and so forth). Complement 310 may additionally include one or more additional identifying parameters for confirmation/verification by subscriber 205. Complement 310 may be stored, at least temporarily, within a memory structure at client 225.

In the embodiment of FIG. 3, device database 230 may additionally supply a trustworthiness score with respect to communications device 102. In particular embodiments, a trustworthiness score may be computed in response to determining events, which may occur with respect to communications device 102. Such events may correspond to a length of time that a subscriber 205 has been in possession of communications device 102 (e.g., device tenure), whether communications device 102 has been recently ported (e.g., involving a telephone number or other subscriber account identifier) from a first communications service carrier to a second communications service carrier, whether a one-time password has been utilized to reset account parameters accessed by communications device 102, as well as any number of additional online or off-line events involving device 102. A trustworthiness score may be computed utilizing a history of other deterministic events, and claimed subject matter is not limited in this respect.

Client 225 may pass additional parameters request 315, via network 130, to subscriber 205. In the embodiment of FIG. 3, an additional parameters request may correspond to a parameter perhaps known only to a select few individuals, such as subscriber 205. Such parameters may include a portion of a Social Security number (e.g., the last four digits) or any other parameter, such as mother's maiden name, name of childhood friend, city of birth, or any other parameter generally not known to others, and claimed subject matter is intended to embrace all such parameters. Responsive to receipt of a request for additional data, which may be displayed via a display of (or coupled to) communications device 102, subscriber 205 may provide requested parameters 320. Requested parameters 320 may propagate through network 130 for receipt by client 225. Responsive to receipt of the requested parameters 320, client 225 may compare requested parameters 320 with a parameter known only to subscriber 205, for example, to determine if a match exists. Responsive to detection of a match, client 225 may determine that subscriber 205 has been authenticated. Accordingly, client 225 may transmit a complement of subscriber parameters (e.g. subscriber parameter complement 330) to communications device 102 for review by subscriber 205.

Responsive to receipt of the complement of subscriber parameters at communications device 102, device 102 may pre-fill (populate) fields of an application or other type of form, perhaps for use in connection with obtaining credit by subscriber 205. Subscriber 205 may merely verify the entries of a pre-filled form displayed via a display of communications device 102. Subscriber 205 may then actuate a "submit" selector, which may operate to convey a completed credit application (e.g., completed application 340), for example, via network 130 to client 225. Upon receipt of a completed credit application, for example, client 225 may compute a credit amount and/or compute any other amount or parameter, and forward such amount to subscriber 205 for display on a display of communications device 102.

Credit amount 350 may be computed based, at least in part, on score 312 computed by (or in cooperation with) identity verifier 228 responsive to accessing device database 230. In particular embodiments, responsive to device database 230 indicating that communications device 102 can be considered to be relatively trustworthy, such as following a determination that fraudulent events have not occurred in connection with device 102, score 312 may comprise a relatively high number. Conversely, responsive to device database 230 indicating that communications device 102 can be considered relatively untrustworthy, such as following a determination that fraudulent events have occurred in connection with device 102, score 312 may comprise a relatively low number.

FIG. 4A shows a communications device displaying an interface to accept a complement of subscriber parameters, according to an embodiment 400. As depicted in FIG. 4A, communications device 102 comprises image capture device 402, which may correspond to a camera, for example. In an embodiment, a subscriber, such as subscriber 205 of FIG. 2, may position machine-readable layout 210 into the field-of-view of image capture device 402. Responsive to machine-readable layout 210 being positioned within the field-of-view of image capture device 402, a process (e.g., an application program interface) executing on a processor of communications device 102 may be directed to connect to a URL for the purpose of initiating a credit application. In alternative embodiments, communications device 102 may be directed to connect to a URL for the purpose of initiating any other type of application, such as an application to upgrade credit (e.g., increase a credit value or credit limit), an application to obtain premium content, or any other type of application, and claimed subject matter is not limited in this respect.

Following communications device 102 being connected to a URL to facilitate initiation of a browser-based session, a computer program executing on a processor of communications device 102 may access an identifier stored on SIM 403. In some embodiments, an identifier stored on SIM 403 may comprise a subscriber account identifier (e.g., a telephone number), International Mobile Subscriber Identifier (IMSI), an International Mobile Electronic Identifier (IMEI), or a Mobile Station International Subscriber Directory Number (MSISDN), or any combination thereof. The identifier may be conveyed through a cellular communications network, such as described with reference to FIG. 1, to a client (e.g., client 225 of FIG. 2), which may correspond to a bank, financial clearinghouse, or other type of institution involved in extending credit, providing premium content, or fighting other types of privileges to subscribers. In turn, client 225 may contact an identity verification service (e.g., identity verifier 228), who may access a device database (e.g., device database 230) to obtain parameters specific to the subscriber 205 co-located with communications device 102. In some embodiments, device database 230 may also provide a trustworthiness score or other measure of trustworthiness, with respect to communications device 102, based, at least in part, on records of historical events involving communications device 102. Such records may include instances of reassignment of subscriber account identifiers (e.g., telephone numbers) from a first communications service carrier to a second communications service carrier, tenure of device 102, instances of password resets with respect to device 102, removal or replacement of a SIM (e.g., SIM 403), along with other behavioral aspects with respect to device 102.

FIG. 4B shows a communications device displaying a user interface into which a complement of subscriber parameters has been pre-filled into the user interface, according to an embodiment. In response to a client (e.g., client 225 of FIG. 2) determining a complement of subscriber-specific parameters corresponding to an identifier accessed from SIM 403, a blank application form, such as indicated in FIG. 4A, may be pre-filled with subscriber-specific parameters. Such parameters may include subscriber's full name, past and/or present addresses, past and/or present employers, and other specific parameters. In particular embodiments, pre-filled application 405 may be displayed on a display of communications device 102 within seconds (e.g., 10 seconds, 20 seconds, 30 seconds, 60 seconds, 90 seconds) of subscriber 205 capturing an image of machine-readable layout 210. In particular embodiments, an intermediate operation, not explicitly indicated in FIGS. 4A/4B may involve subscriber 205 verifying one or more additional parameters, such as the last four digits of a Social Security number (just to name an example) as an approach toward validating and/or a verifying the identity of subscriber 205, prior to conveying the complement of subscriber-specific parameters indicated as pre-filled application 405. In particular embodiments, a subscriber may actuate submit selector 407, so as to submit the completed credit application to a lending institution or its representative.

FIG. 5 shows a process of transmitting a complement of subscriber parameters to a device, according to an embodiment 500. It should be noted that the disclosed embodiments, such as the embodiment of FIG. 5, are intended to embrace numerous variations, including methods that may include actions in addition to those depicted in the figures, actions performed in an order different than those depicted in the figures, as well as methods including fewer steps than those depicted. The method of FIG. 5 begins at 505, which includes obtaining, from a communications device (e.g., a mobile communications device), an identifier of the communications device transmitted via a communications network. 505 may involve a subscriber (such as subscriber 205 of FIG. 2) capturing an image of a machine-readable layout in order to initiate an application for credit, or an application for any other type of privilege including upgrading an existing line of credit, obtaining access to privileged content, etc. attempting to initiate an electronic or digital transaction, such as an electronic financial transaction, by contacting a bank, brokerage, or other institution. 505 may additionally include a communications device transmitting an identifier, such as accessed from a SIM of a communications device.

At 510, responsive to a client (such as client 225 of FIG. 2) obtaining name, address, and other parameters of subscriber 205, a client may transmit, to the communications network, a request for one or more parameters unique to a subscriber of a communications network (e.g., subscriber 205). Such parameters may include a date of birth, Social Security number, mother's maiden name, etc. At 515, in response to receiving a response from subscriber 205 for one or more additional parameters, a client, such as client 225 of FIG. 2, may determine if a match exists between the one or more additional parameters and the name, address, and other parameters obtained from an identity verification service (e.g., identity verifier 228 of FIG. 2). 515 may include processing of signals indicative of the requested one or more parameters provided in response to the subscriber entering the one or more parameters into a graphical user interface of the communications device. For example, at 515, the last four digits of a Social Security number accessed from device database 230 may be compared with the last four digits supplied by a subscriber 205 in response to the request for one or more parameters (such as described in reference to 510).

At 520, responsive to a match existing between the last four digits of a Social Security number (for example) provided by a subscriber and (again, for example) the last four digits of a Social Security number provided by a device database, a client may transmit, to the communications device, one or more signals to provide a complement of subscriber parameters. A complement of subscriber parameters may be utilized to pre-fill an application form, or other type of form, displayed on a display of a communications device located with subscriber 205.

Figure 6:
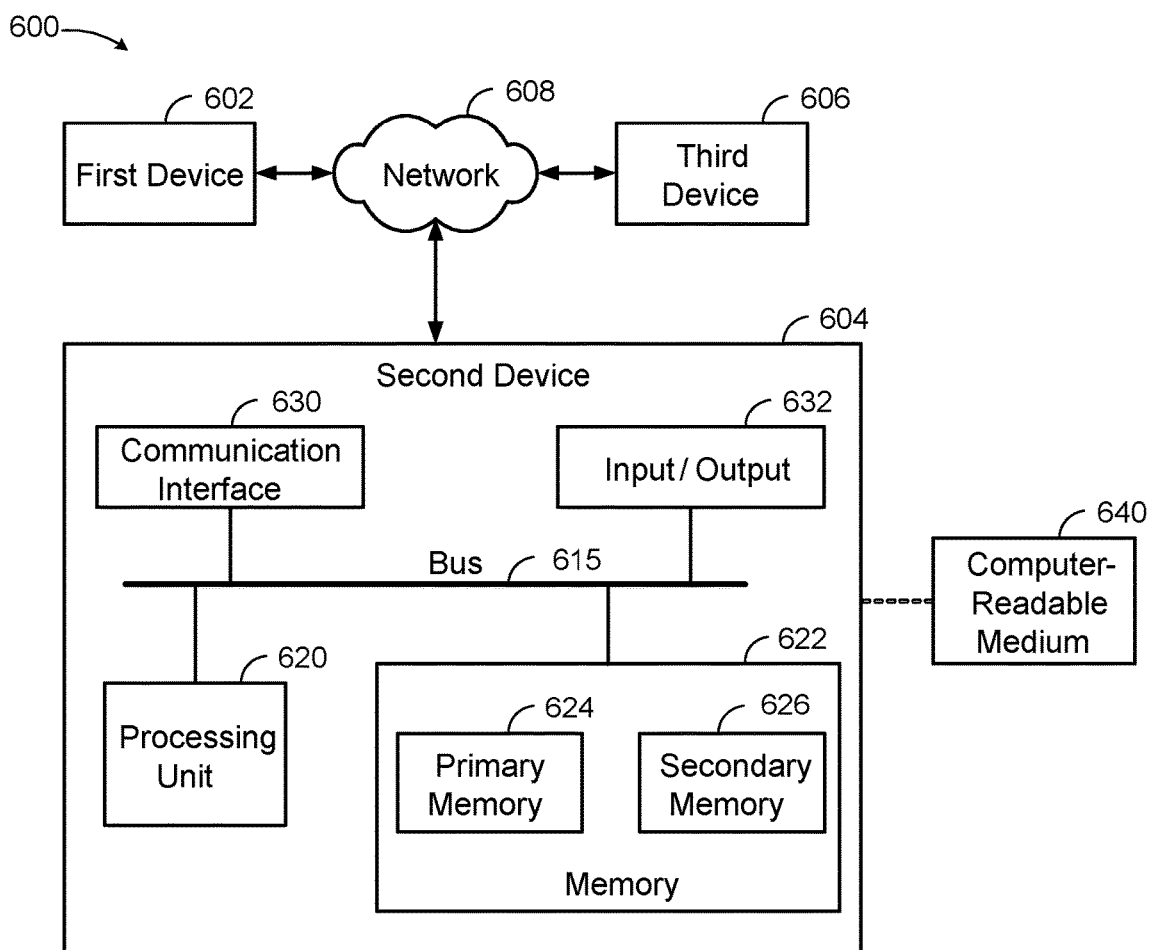
FIG. 6 is a diagram showing a computing environment, according to an embodiment.

FIG. 6 is a diagram showing a computing environment, according to an embodiment 600. In the embodiment of FIG. 6, first and third devices 602 and 606 may be capable of rendering a graphical user interface (GUI) for a network device, such as server device 140 of FIG. 1, so that a subscriber utilizing a communications device (e.g., a mobile communications device) may engage in system use. Device 604 may potentially serve a similar function in this illustration. Likewise, in FIG. 6, computing device 602 ('first device' in FIG. 6) may interface with computing device 604 ('second device' in FIG. 6), which may, for example, also comprise features of a client computing device and/or a server computing device, in an embodiment. Processor (e.g., processing device) 620 and memory 622, which may comprise primary memory 624 and secondary memory 626, may communicate by way of a communication interface 630, for example. The term "computing device," in the context of the present patent application, refers to a system and/or a device, such as a computing apparatus that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 604, as depicted in FIG. 6, is merely one example, and claimed subject matter is not limited in scope to this particular example.

In FIG. 6, computing device 602 may provide one or more sources of executable computer instructions in the form of physical states and/or signals (e.g., stored in memory states), for example. Computing device 602 may communicate with computing device 604 by way of a network connection, such as via network 608, for example. As previously mentioned, a connection, while physical, may be virtual while not necessarily being tangible. Although computing device 604 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may comprise one or more articles utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described. Generated signals may also be stored in memory, also previously suggested.

Memory 622 may store electronic files and/or electronic documents, such as relating to one or more subscribers, and may also comprise a machine-readable medium that may carry and/or make accessible content, including code and/or instructions, for example, executable by processor 620 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 620 may comprise one or more circuits, such as digital circuits, to perform at least a portion of a computing procedure and/or process. By way of example, but not limitation, processor 620 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, and communication bus 615, for example, so that signals and/or states may be appropriately communicated between devices, such as device 604 and an input device and/or device 604 and an output device. A subscriber may make use of an input device, such as a computer mouse, stylus, track ball, keyboard, and/or any other similar device capable of receiving subscriber actions and/or motions as input signals. Likewise, for a device having speech to text capability, a subscriber may speak to generate input signals. Likewise, a subscriber may make use of an output device, such as a display, a printer, etc., and/or any other device capable of providing signals and/or generating stimuli for a subscriber, such as visual stimuli, audio stimuli and/or other similar stimuli.

Figure 7:
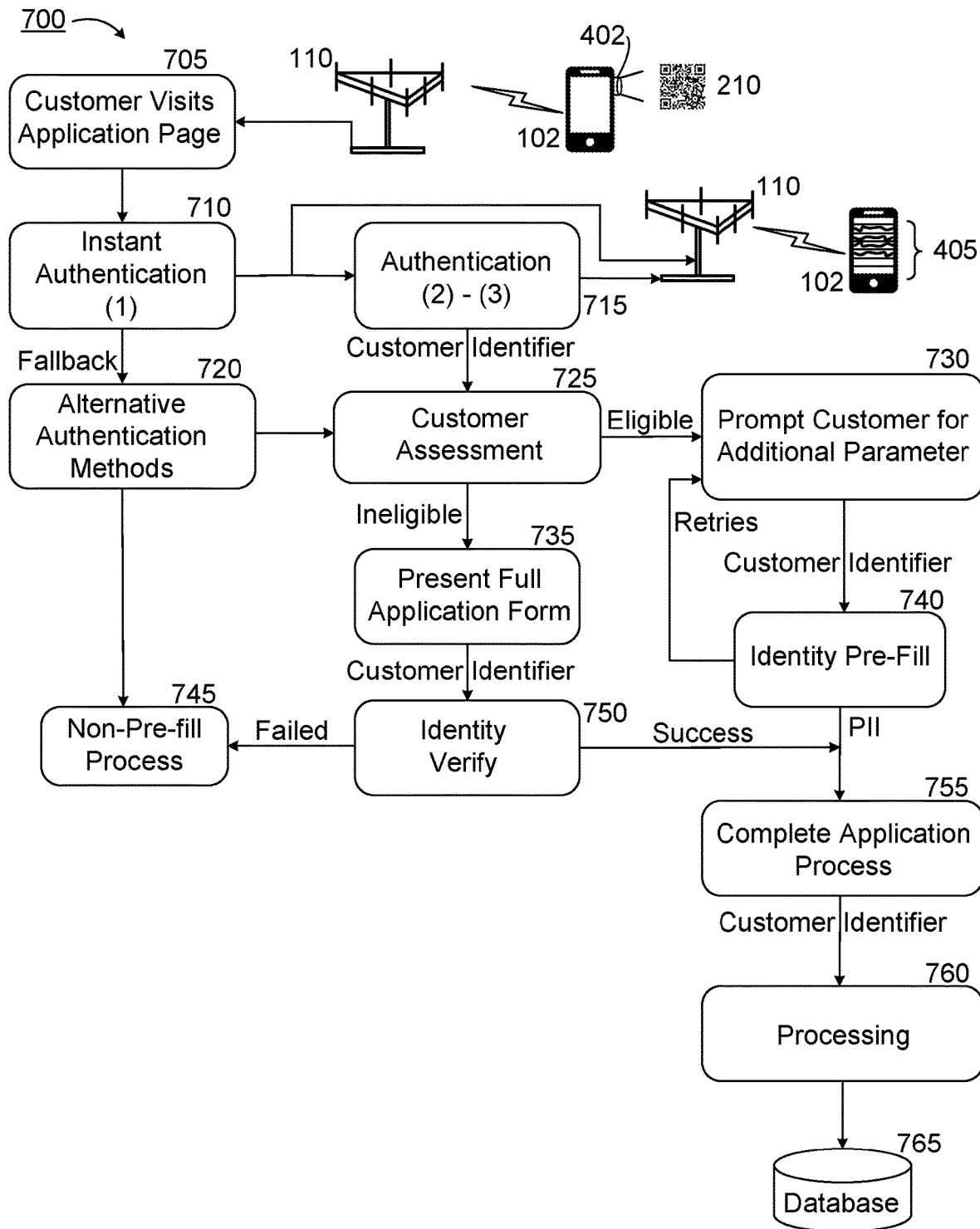
FIG. 7 shows a flowchart for a process of transmitting a complement of subscriber parameters to a communications device, according to an embodiment.

FIG. 7 shows a flowchart for a process of transmitting a complement of subscriber parameters to a communications device, according to an embodiment 700. The process of FIG. 7 may begin at 705, which may include a subscriber) visiting an application page of a merchant or financial institution affiliated with the merchant. 705 may involve a subscriber locating a machine-readable layout (e.g., machine-readable layout 210) within the field-of-view of an imaging device 402 (e.g., a camera) of communications device 102. The process may proceed with an instant authentication subprocess (1) in which a subscriber may be determined to be eligible and a pre-fill or auto-filled selector is presented in a user interface of communications device 102 as in 715. Following selection of a selector to pre-fill or auto-fill an application, pre-filled application 405 may be displayed on a display of communications device 102.

Responsive to a determination that a subscriber may not be eligible for pre-fill or auto-fill, a pre-fill or auto-fill selector may not be displayed. In this instance, 715 may invoke a manual process (e.g., authentication (2)). Also at 715, responsive to a determination that a potential subscriber is eligible for pre-fill or auto-fill, but chooses to manually complete and e-commerce checkout, digital sign-up or completion of a credit application, an identity verifier may verify manually-entered parameters utilizing identity verification. In such a scenario (e.g., authentication (3)), parameters may be obtained from communication services providers, credit bureaus, and/or prepaid processors. In such instances, matching algorithms may be applied to parameters obtained utilizing, for example, fuzzy matching, gender, inversions, old but valid addresses, householding for family plans etc., and claimed subject matter is intended to embrace all such approaches.

In a fallback subprocess, one or more alternative authentication methods 720 may be performed. In a particular embodiment, as part of customer assessment 725 the subscriber may be prompted to enter a telephone number or other type of subscriber account identifier. In response to receiving a subscriber account identifier (e.g., a telephone number) an identity verifier (e.g. identity verifier 228 of FIG. 2) may compute or obtain a trustworthiness measure (e.g., a trust score), such as at 725. Just as an example, in response to the computed or obtained trust score being greater than a predetermined value, a link may be conveyed, such as via SMS. Responsive to receipt of an SMS message, a subscriber may select the link, resulting in verification of the communications device. Continuing with an example, in response to the computed or obtained trust score being less than the predetermined value, the subscriber may be directed to complete an application for credit (for example) utilizing a standard (e.g., manual entry) treatment or process.

Upon receipt of an authentication request, a verified mobile telephone number (or other type of subscriber account identifier) may be utilized as part of a real-time process to verify and/or authenticate a subscriber. Authentication may be achieved via direct authentication utilizing parameters stored in, for example, device database 230, or via transmission of a one-time short messaging system (SMS) transmission of a passcode, and/or via transmission of a one-time passcode from, for example, a call center through a telephone call (e.g., a voice call) to a particular phone number. To ensure the security of such processes, such as described in reference to FIG. 2, a communications device and/or other ancillary devices may participate in an authentication process. The authentication process may make use of a temporary, time-limited (e.g., 1 second, 1 minute, 1 hour, 1 day, etc.) identifier unique to a current authentication event. Such identifiers may include, but are not limited to, WIFI IP addresses, virtual private network (VPN) identifiers (e.g., VPN-IDs, etc.), and/or any other ancillary or like identifiers (e.g., a browser cookie, a browser fingerprint, etc.) generated during an authentication subprocess. In some embodiments, such identifiers may be passed between, for example, an identity verifier and a mobile device so as to maintain a linkage between individual steps of an authentication process. Use of such identifiers may prevent or at least reduce the occurrence of third parties submitting fraudulent requests in connection with (or attempting to intervene within) an authentication process or event. If a request is made either with a fraudulent, incorrect identifier or after the expiration of the identifier (e.g., 1 second, 1 minute, 1 hour, 1 day, etc.), the process, such as described in reference to FIG. 2, may be terminated. Termination of an authentication process may be followed by a fresh (e.g., repeated) authentication request. If repeated requests (e.g., 2 requests, 3 requests, 5 requests, etc.) are made with fraudulent, incorrect, and/or expired identifiers unique to the current authentication event, within a certain time frame (e.g., 1 second, 1 minute, 1 hour, 1 day, etc.), the process, such as described in reference to FIG. 2, may be terminated and the subscriber may be temporarily blocked (e.g., 1 hour, 1 day, 1 month, 1 year, etc.) from initiating further authentication events.

In response to an assessment (such as customer assessment 725) indicating that a subscriber (such as subscriber 205) is eligible for pre-fill (as described with respect to 710) a prompt (such as at 730) for the subscriber to enter additional parameters, such as, for example, an identifier comprising the last four digits of a Social Security number, may be conveyed to the subscriber's communications device. Responsive to correct entry of the subscriber identifier (e.g., the last four digits of a Social Security number), which matches the last four digits of a Social Security number stored, for example, in device database 230 of FIG. 2, a complement of parameters may be transmitted to the communications device in the subscriber's possession (e.g., at 740). In particular embodiments up to 3 attempts (e.g., retries) to enter a parameter, such as the last four digits of a Social Security number, may be permitted. The complement of parameters may then be pre-filled into a form in the application process may be completed (e.g., at 755). The subscriber's customer ID, subscriber account identifier, or any other identifying number, such as a persistent identifier other than a telephone number, may undergo data processing (e.g., at 760) for entry into a database (e.g. 765) for future reference (e.g., at 760).

In particular embodiments, in response to determining that a subscriber is ineligible for pre-fill of, for example, an application for credit, the subscriber may be presented with a blank application form for manual entry (e.g., at 735). Responsive to the subscriber successfully (manually) entering a complement of parameters (e.g., non-pre-fill process 745), such as phone number and personally identifiable information, an identity verification subprocess may be performed. Responsive to successful completion of identity verification based on manually-entered subscriber parameters, personally identifiable information may be utilized to complete the application process, the results of which may be stored in to a customer or subscriber database. A non-pre-fill process (e.g., at 745) may be invoked responsive failure of an identity verification process (e.g., at 750). A non-pre-fill process (e.g., at 745) may involve use of paper credit applications, for example, transmitted to an issuing bank or other financial institution, utilizing a manually-completed form.

In addition to apparatuses and approaches toward transmitting a complement of subscriber-unique parameters to a communications device, the foregoing provides illustrative examples of accounts in which a risk of fraud and/or unauthorized actions may exist. In accordance with such illustrative examples, a subscriber may attempt to access a bank account via a voice call, a web browser, or by utilizing a computer process executing on a communications device, for example, which may permit the subscriber to complete an application for credit. Thus, a bank, lender, brokerage firm, or any other type of financial institution, in response to the attempt to access the bank account, may employ an application programming interface (API) substantially compatible and/or substantially compliant with HTTP and/or HTTPS, including versions now known and/or to be later developed, and/or another suitable protocol (e.g., now known and/or to later be developed). In the foregoing example, a subscriber may seek to take one or more actions with respect to an account, such as, for example, establishing an account, updating a credit value (e.g., credit limit) for an account, transferring funds, viewing a history of electronic or digital transactions, updating privileged content and/or parameters, etc. Further, a bank, lender, Thus, as suggested, a user may seek to obtain and/or access, for example, an online account. A third party, such as those who may provide such an account, may seek to provide an appropriate level of access control for such reasons as maintaining confidentiality of customer or subscriber information. In an example, a software company and/or product, such as a developer of tax-preparation software products, permit individual subscriber accounts to be established. It may also be appreciated that similar protections may be instituted in which confidentiality may not be an aspect. For example, with regard to management of certain types of privileged content and/or parameters, a user may seek to access such content in connection with an online subscription to a major newspaper. In another instance, a user may desire to access privileged content and/or parameters, whether such content corresponds to personalized content (e.g., of a social media network) or does not correspond to personalized content, such as premium sports-related content. In another instance, a user may be returning to a website, and accessing the website could be dependent, at least partially, on binding a user with a website and/or with an application, such as via an account for the user. In another example, a user may actuate a 'click-to-call' selector of a website and/or application to reach customer care. Thus, a third party may comprise a customer care facility of an enterprise, for example, such as a care facility of a bank, which may manage affairs related to new customer credit accounts, changes to existing credit accounts, and/or manage a host of other matters related to customer credit. Yet another scenario may involve confidentiality associated with access to medical records of patients, such as compliance with HIPAA, the Affordable Care Act, Electronic Medical Records, and/or other regulatory schemes. A variety of potential situations may arise in which a user may seek access to records, such as a patient, a company, such as for insurance, a hospital, a medical professional providing care, etc. Thus, again, a subscriber or authorized agent may log into a subscriber's medical record account that may exist online and/or be stored electronically, such as on a website. In particular scenarios, medical records access may be granted in response to a subscriber completing an application in which proper credentials are to be supplied. As yet another example, a variety of corporate programs, including as examples, airline mileage accounts, gift cards, etc., in which value has been accumulated, may be managed as online accounts, which may be accessed in response to a subscriber completing an application for such access. Thus, all of the foregoing examples, and others, accounts are subject to risk associated with fraud and/or unauthorized actions by an unscrupulous individual.

Thus, in possible scenarios, an unscrupulous individual may attempt, for example, to fraudulently obtain credit, for example, utilizing a communications device belonging to a different subscriber. However, by accessing a data store, a financial institution, for example, may challenge credentials of the unscrupulous individual, such as by accessing a data store to detecting whether a transfer (e.g., a porting event) associated with the purported subscriber's account identifier has recently occurred. A data store may also provide an indication of a subscriber's communications device has undergone a replacement of a SIM, an indication of a subscriber's tenure of position of a communications device, whether a subscriber has recently reset a password (such as the receipt of a one-time password), or as engaged in any other activity related to a device that could indicate potential for fraudulent activity. Preventing fraudulent transactions may bring about a reduction in instances of identity theft, fraud related to credit cards or other instruments, circumventing of parental controls, and so on.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is common. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter

What is claimed is:

1. A method comprising:
   determining, by a computing device, a trustworthiness score associated with a communications device;
   responsive, at least in part, to determining, by the computing device, that the trustworthiness score associated with the communications device meets a predetermined criterion, authenticating, by the computing device, the subscriber of a communications network co-located with the communications device at least in part by obtaining from the communications device, via the communications network, a time-limited-type identifier generated during a particular authentication operation, wherein the time-limited-type identifier is unique to the particular authentication operation;

obtaining, by the computing device, a complement of subscriber parameters stored in a database;

responsive, at least in part, to obtaining the complement of subscriber parameters, requesting, from the communications device via the communications network, a first set of parameters that is unique to the subscriber;

obtaining, by the computing device, the first set of parameters from the communications device; and responsive, at least in part, to determining, by the computing device, that the first set of parameters match a second set of parameters, wherein the second set of parameters is stored in the database, transmitting, from the computing device to the communications device, the complement of subscriber parameters to be pre-filled on a form to be displayed on the communications device.

2. The method of claim 1, further comprising:
receiving, by the computing device, a captured image of one or more machine-readable layouts, from the communications device via the communications network, prior to obtaining the time-limited-type identifier from the communications device.

3. The method of claim 2, wherein the one or more machine-readable layouts comprise a quick response (QR) code.

4. The method of claim 1, wherein the time-limited-type identifier is obtained from the communications device at least in part in response to a processor of the communications device accessing a subscriber identity module (SIM) of the communications device.

5. The method of claim 4, wherein the time-limited-type identifier comprises an international mobile subscriber identifier (IMSI), an international mobile electronic identifier (IMEI), or a Mobile Station International Subscriber Directory Number (MSISDN), or any combination thereof.

6. The method of claim 1, wherein the communications network forms a part of a mobile cellular communications network.

7. The method of claim 1, wherein the first set of parameters comprises a portion of a social security number and/or a date-of-birth.

8. The method of claim 1, further comprising transmitting, to the communications device, one or more numerical values.

9. The method of claim 8, wherein the one or more numerical values comprise a credit limit and/or an incentive amount.

10. The method of claim 1, wherein the complement of subscriber parameters comprises, at least a physical address of the subscriber.

11. An apparatus comprising:
at least one processor coupled to at least one memory device to:
determine, by a computing device, a trustworthiness score associated with a communications device;
responsive, at least in part, to determining, by the computing device, that the trustworthiness score associated with the communications device meets a predetermined criterion, authenticate the subscriber of a communications network co-located with the communications device at least in part by obtaining from the communications device, via the communications network, a time-limited-type identifier generated during a particular authentication operation, wherein the time-limited-type identifier is unique to the particular authentication operation;

obtain, by the computing device, a complement of subscriber parameters stored in a database;

responsive, at least in part, to obtaining the complement of subscriber parameters, request, from the communications device via the communications network, a first set of parameters that is unique to the subscriber;

obtain the first set of parameters from the communications device; and responsive, at least in part, to determining by the computing device that the first set of parameters match a second set of parameters, wherein the second set of parameters is stored in the database, initiate transmission, from the computing device to the communications device, of the complement of subscriber parameters to be pre-filled on a form to be displayed on the communications device.

12. The apparatus of claim 11, wherein the at least one processor coupled to the memory device is additionally to:
initiate determination of a measure of trust corresponding to the communications device in response to one or more accesses of the database.

13. The apparatus of claim 11, wherein the at least one processor coupled to the at least one memory device is additionally to:
initiate processing of signals representing a captured image of one or more machine-readable layouts obtained from the communications device.

14. The apparatus of claim 11, wherein the complement of subscriber parameters includes one or more signals indicative of a physical address of the subscriber.

15. The apparatus of claim 11, wherein the first set of parameters includes one or more parameters indicative of an image of a quick response (QR) code captured by an imaging device accessible to the communications device.

16. The apparatus of claim 11, wherein the time-limited-type identifier comprises an international mobile subscriber identifier (IMSI), an international mobile electronic identifier (IMEI), or a mobile subscriber international subscriber identification number (MSISDN), or any combination thereof.

17. An article comprising:
a non-transitory storage medium having instructions stored thereon executable by a special-purpose computing platform to:
determine, by a computing device, a trustworthiness score associated with a communications device;
responsive, at least in part, to determining, by the computing device, that the trustworthiness score associated with the communications device meets a predetermined criterion, authenticate the subscriber of a communications network co-located with the communications device at least in part by obtaining from the communications device, via the communications network, a time-limited-type identifier generated during a particular authentication operation, wherein the time-limited-type identifier is unique to the particular authentication operation;
obtain, by the computing device, a complement of subscriber parameters stored in a database;
responsive, at least in part, to obtaining the complement of subscriber parameters, request, from the communications device via the communications network, a first set of parameters that is unique to the subscriber;

obtain the first set of parameters from the communications device; and responsive, at least in part, to determining by the computing device that the first set of parameters match a second set of parameters, wherein the second set of parameters is stored in the database, initiate transmission, from the computing device to the communications device, of the complement of subscriber parameters to be pre-filled on a form to be displayed on the communications device.

18. The article of claim 17, wherein the complement of parameters of the subscriber is to include parameters to indicate a physical address of the subscriber.

19. The article of claim 17, wherein the non-transitory storage medium includes instructions to determine a measure of trustworthiness of the communications device.

20. The article of claim 17, wherein the non-transitory storage medium includes instructions to transmit, to the communications device, one or more numerical values to indicate a credit limit and/or an incentive amount to the subscriber.

21. The article of claim 17, wherein the communications network forms a part of a mobile cellular communications network.

* * * * *